(12) United States Patent
Mancosu et al.

(10) Patent No.: US 7,999,663 B2
(45) Date of Patent: Aug. 16, 2011

(54) TYRE PROVIDED WITH A DEVICE FOR DETECTING AT LEAST ONE FUNCTIONAL PARAMETER OF THE TYRE ITSELF, AND A METHOD FOR DETECTING AT LEAST ONE FUNCTIONAL PARAMETER IN A TYRE

(75) Inventors: Federico Mancosu, Milan (IT); Anna Paola Fioravanti, Milan (IT); Massimo Brusarosco, Milan (IT); Fabio Mariani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 520 days.

(21) Appl. No.: 11/920,150

(22) PCT Filed: Jun. 28, 2005

(86) PCT No.: PCT/IT2005/000373
§ 371 (c)(1),
(2), (4) Date: Jan. 14, 2009

(87) PCT Pub. No.: WO2007/000781
PCT Pub. Date: Jan. 4, 2007

(65) Prior Publication Data
US 2009/0115591 A1    May 7, 2009

(51) Int. Cl.
*B60C 23/00*    (2006.01)
(52) U.S. Cl. .................... 340/445; 340/439; 340/870.07
(58) Field of Classification Search .................. 340/445, 340/442, 438, 425.5, 447, 870.01, 439, 440, 340/441, 446–449, 870.07
See application file for complete search history.

(56) References Cited

U.S. PATENT DOCUMENTS

| | | | |
|---|---|---|---|
| 4,338,989 A * | 7/1982 | Sperberg | 152/556 |
| 4,510,484 A | 4/1985 | Snyder | |
| 5,490,552 A * | 2/1996 | Vignoli | 157/1.24 |
| 6,175,302 B1 | 1/2001 | Huang | |
| 6,217,683 B1 | 4/2001 | Balzer et al. | |
| 6,438,193 B1 | 8/2002 | Ko et al. | |
| 7,096,908 B2 * | 8/2006 | Boiocchi et al. | 152/517 |
| 2003/0146676 A1 * | 8/2003 | Mancosu et al. | 310/339 |
| 2004/0094251 A1 | 5/2004 | Strache et al. | |
| 2005/0028918 A1 * | 2/2005 | Caretta et al. | 156/117 |

FOREIGN PATENT DOCUMENTS

| | | |
|---|---|---|
| DE | 44 02 136 A1 | 7/1995 |
| WO | WO 99/29525 | 6/1999 |
| WO | WO 03/095243 A1 | 11/2003 |
| WO | WO 03/095244 A1 | 11/2003 |
| WO | WO 2004/030948 A1 | 4/2004 |

* cited by examiner

*Primary Examiner* — Daniel Previl
(74) *Attorney, Agent, or Firm* — Finnegan, Henderson, Farabow, Garrett & Dunner, L.L.P.

(57) ABSTRACT

Fastened to a tire is a detecting device consisting of a detecting unit including an antenna operatively connected to a sensor unit and a power supply unit including a piezoelectric element mounted in a housing. The piezoelectric element is disposed within the housing so as to have a first end substantially fixed to the housing and a second end associated with a loading mass, a gap being formed between at least one inner wall of the housing and an outer surface of the loading mass. The piezoelectric element is positioned substantially along a plane orthogonal to a radial direction of the tire. An anchoring body has a base portion with a fastening surface secured to the radially internal surface of the tire. The detecting unit is brought into engagement with the anchoring body by insertion of the inner perimetral edge of the antenna into a perimetral groove formed between the base portion and a retaining portion.

75 Claims, 14 Drawing Sheets

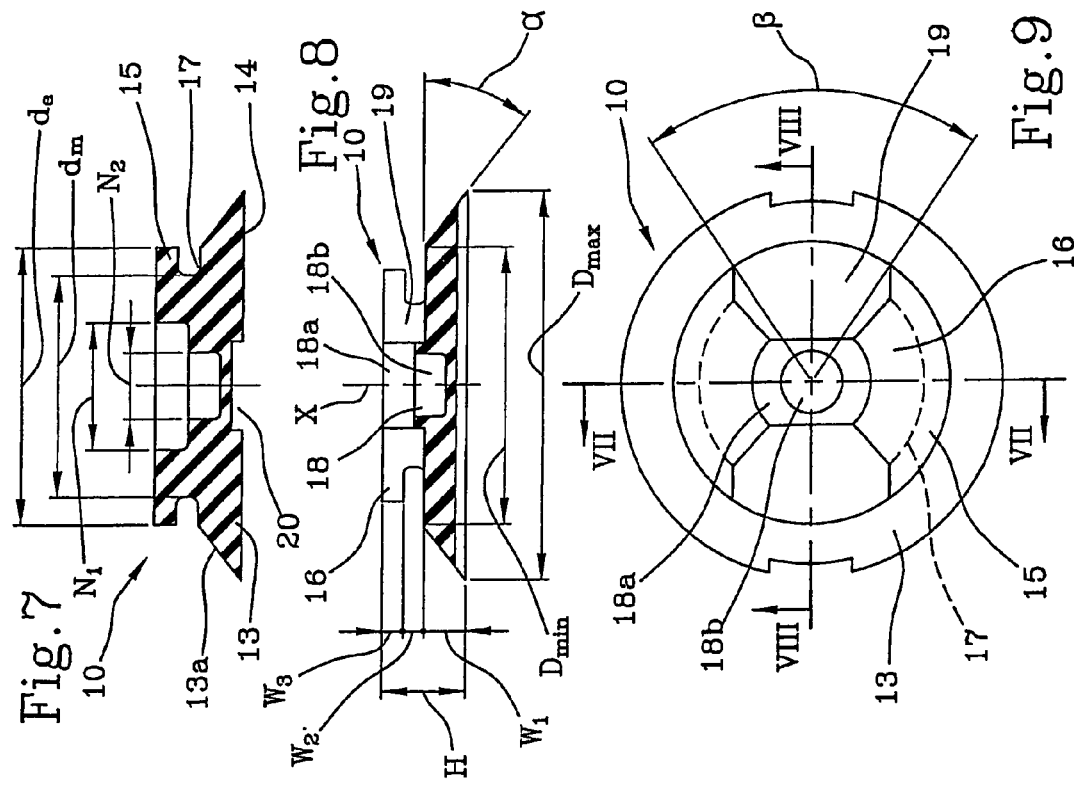
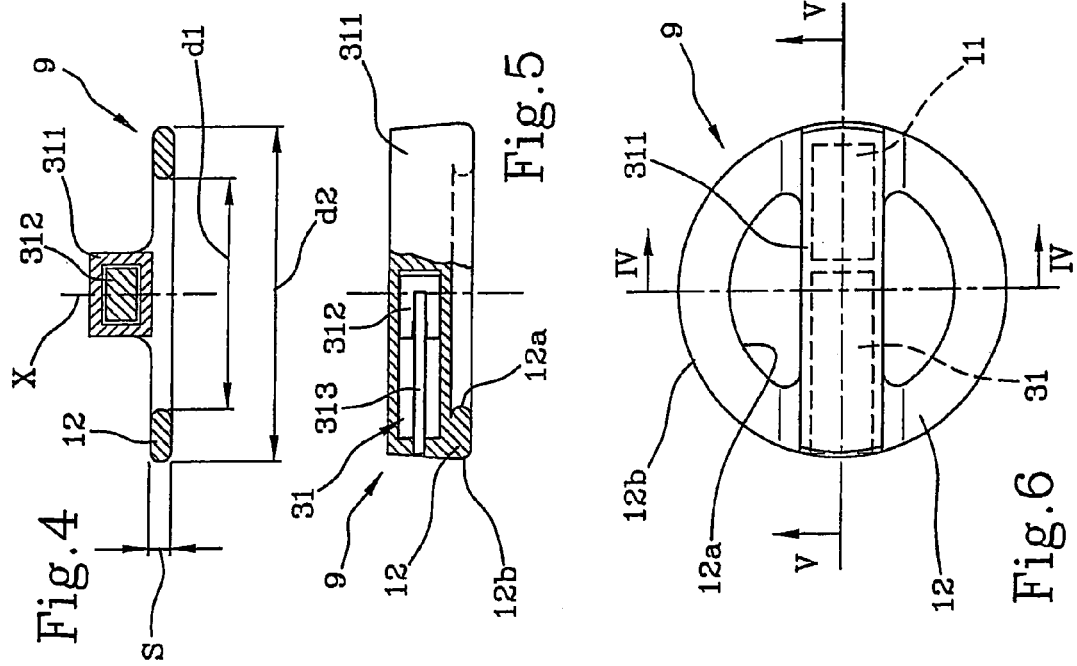

TYRE PROVIDED WITH A DEVICE FOR DETECTING AT LEAST ONE FUNCTIONAL PARAMETER OF THE TYRE ITSELF, AND A METHOD FOR DETECTING AT LEAST ONE FUNCTIONAL PARAMETER IN A TYRE

CROSS REFERENCE TO RELATED APPLICATION

This application is a national phase application based on PCT/IT2005/000373, filed Jun. 28, 2005, the content of which is incorporated herein by reference.

FIELD OF THE INVENTION

The present invention relates to a tyre comprising a device for detecting at least one functional parameter of the tyre itself. Said invention also relates to a detecting device, a detecting system, as well as a method for detecting at least one functional parameter in a tyre.

DESCRIPTION OF THE RELATED ART

On some types of vehicles the necessity is felt to monitor the operating conditions of the tyres and to possibly keep traces of the evolution in time of some characteristic operating parameters. For this reason, the incorporation of electronic devices within pneumatic tyres is taking a greater importance in order to increase safety of vehicles. For instance, when vehicles using tyres of the run flat type are concerned, i.e. tyres capable of ensuring some kilometers of distance covered even in case of tyre deflation, provided some characteristic parameters are complied with such as maximum speed, temperature and maximum distance to be traveled over, the above requirement is particularly felt for safe use of said type of tyres.

Tyre electronics may include sensors and other components suitable for obtaining information regarding various functional parameters of a tyre, such as for example identification code, temperature, pressure, distance run by the tyre, as well as parameters originating from mathematical calculations that can be carried out within the tyre or on board the vehicle. Such information may become useful in tyre monitoring and/or warning systems. Furthermore, active control systems of the vehicle may be based on information sent from sensor devices included within the tyres.

To this aim, within the tyre a detecting device can be mounted which can comprise at least one sensor, possibly associated with a control unit and/or a data storage unit (such as a microprocessor) and an antenna which enables radio-frequency signal exchange with the devices mounted on board the vehicle.

Such integrated tyre electronics have conventionally been powered by a variety of techniques and different power generation systems.

A typical solution for powering tyre electronics systems is the use of a non-rechargeable battery, which may cause inconveniences to a tyre user since proper electronics system operation is dependent on periodic battery replacement. As a matter of fact, batteries tend to deplete their energy storage quite rapidly when powering electronic applications characterized by complex levels of functionality. Furthermore, conventional batteries typically contain heavy metals that are not environmentally friendly and which present disposal concerns, especially when employed in numerous quantity. Moreover, performances of conventional batteries are often influenced by temperature: in particular, the functioning of such batteries is not reliable at low temperatures.

Another known method for powering tyre monitoring systems is a coupling of radio-frequency (RF) power between an antenna disposed on the vehicle in close proximity with the antenna included within the electronic device disposed in the tyre.

For example, U.S. Pat. No. 6,217,683 proposes a detecting device in which a detecting unit is removably in engagement with a retaining system fixed to an inner surface of the tyre in the sidewall region thereof, by a layer of rubberised cloth. The retaining system may comprise fastening tapes to be torn off, set to encircle the detecting unit, or fitting elements in the form of indented pins for example, to be engaged by snap-fitting into respective openings arranged in the detecting unit. In another embodiment, the retaining system comprises one or more button-like elements formed of a stem carrying a swollen head to be inserted into a through opening set in the detecting unit. The detecting unit is subsequently moved to engage the stem along a slide slot extending from the through opening and having a smaller width than the swollen end, so that the detecting unit is retained.

In US 2004/0094251 a detecting unit provided with a built-in annular antenna is connected, for example, by snap-engagement to a stem fastened to the inner surface of the tyre and carrying a swollen end, so as to cause a steady geometric engagement between the parties.

However, in such a kind of embodiments involving provision of a small antenna embedded within the detecting device, RF coupling is made difficult, also due to the use of metallic materials within and around the tire due to steel reinforcing members in the tire and a metallic rim plus metallic vehicle parts.

For this reason, in order to obtain a reliable RF coupling between the module within the tire and the devices mounted on the vehicle, use of large antennas extending over the whole circumferential development of the tyre is often required, for example as proposed by in WO-99/29525. However, provision of such a large antenna significantly complicates the tyre manufacturing process.

In addition, powering of the detecting device by RF coupling requires antennas disposed in vehicle portions frequently exposed to damage from road hazards, and thus may not be a desirable solution for powering tyre electronic applications.

The use of piezoelectric elements has also been proposed for powering tyre monitoring systems. Piezoelectricity is a property of certain materials, such as quartz, Rochelle salt, and certain solid-solution ceramic materials such as lead-zirconate-titanate (PZT), of generating electricity when mechanically stressed.

For example, PCT patent application WO 01/80327 A1 discloses a system for generating electrical energy in a vehicle tyre, comprising at least one elongate piezoelectric element which extends in a longitudinal direction along at least a portion of the tyre. The elongate piezoelectric element preferably comprises a coaxial cable extending along a straight or undulated path of the tyre circumference.

WO patent application no. 03/095244 A1 discloses a system for generating electric power from a rotating tyre's mechanical energy that has a piezoelectric structure and an energy storage device. The structure comprises a plurality of piezoelectric fibers embedded in a generally unidirectional fashion in an epoxy matrix. The structure is mounted on a support substrate for uniformly distributing mechanical strain in the piezoelectric structure. The structure is mounted within a tyre for generating electric charge as the wheel moves along a ground surface.

U.S. Pat. No. 4,510,484 discloses a device provided for sensing the condition of a pneumatic tyre mounted on a tyre rim and subject to normal vibrations. The device comprises a housing, a band for mounting the housing to the tyre rim, a sensor for monitoring the condition within the tyre, circuitry operatively connected to the sensor for generating radio signals indicative of the tyre condition, power supplier operatively connected to the circuitry and a receiver for receiving the radio signals. The power supplier includes a radially extending piezoelectric reed having a base portion and an end portion. The base portion is elastomerically bonded to the housing. A tuning mass member is mounted to the end portion and is configured for mating abutment against stop members which limit the flexure stroke of the piezoelectric reed and inhibit the compound bending of the reed. The tuning mass member is sized relative to the piezoelectric reed to obtain a natural resonant frequency of vibration of the power supplier of approximately 60 Hz, corresponding to common wheel vibrations which occur during vehicle operations. In operation, centrifugal forces operate to urge the tuning mass member away from the radiating centre of the rotating wheel. Such forces tend to align the plane defined by the piezoelectric reed element with a radiating centre line. In the event the reed element is not aligned at a rest equilibrium state with a radiating centre line, centrifugal forces cause the reed element to bend into such an alignment and may urge the tuning mass member into continued engagement with an adjacent stop member. Such continued engagement would operate to reduce the vibration of the reed element and accordingly reduce the ability of the power supplier to power the radio circuit. When the reed element is properly aligned along a radiating centre line, the power supplier may enjoy a maximum vibrational stroke during operation with optimum ability to power the radio circuit.

U.S. Pat. No. 6,438,193 discloses a self-powered revolution counter of a tyre, comprising a mechanical-electrical energy converter and a revolution counting circuit. One piezoelectric crystal element acts both as energy converter and as revolution sensor. The piezo element is attached to or embedded within the inner wall of the tyre, under the tread or the sidewall, in a way which causes it to flex with the tyre each time the circumferential sector of the tyre containing the piezo element is compressed against the road or other vehicle-supporting surface. A positive pulse is generated when the piezo element is flexed. When straightened again, the piezo element produces damped oscillating positive/negative signal at a significantly lower peak level than the positive pulse. The damped oscillations are determined by physical characteristics of the piezo element (mass, compliance). A typical measured oscillation frequency is on the order of 100 Hz. According to the authors, these oscillations are beneficial for energy conversion. A preferred embodiment of the piezo element disclosed in the '193 patent is a circular unimorph having two circular plates bonded together and a piezo crystal plate in the centre. According to the authors, the stress distribution is more uniform in this configuration than that obtained with a bimorph implemented in a typical cantilever mounting. The authors also disclose that an open voltage of 34 V was obtained with a large deflection in a tested cantilever-mounted bimorph piezo element. However, the Applicant notes that details related to the structure of the tested cantilever-mounted bimorph piezo element and to its mounting within the tyre are not disclosed in the '193 patent.

SUMMARY OF THE INVENTION

The Applicant has faced the problem of generating a sufficient power to be supplied to an electronic device, included within a tyre, adapted for monitoring at least one tyre parameter by mechanical-electrical energy conversion, exploiting piezoelectric effect. According to the Applicant, a structure of piezoelectric element suitable for obtaining this result should be of a cantilever-mounted flexure type, mounted in a portion of the tyre in correspondence of a tread area. However, another requirement for the piezoelectric element is durability. In other words, a structure comprising a cantilever-mounted flexure type piezoelectric element, mounted in a portion of a tyre in correspondence of a tread area, should also guarantee a resistance to early cracks and/or breakings that may be caused by the tremendous centrifugal force to which the piezoelectric element is subjected during rolling of the tyre, especially at high speed.

The Applicant has verified that a sufficient power, together with a long durability, can be obtained by disposing a piezoelectric element in a cantilever-mounted fashion within a housing associated to a tyre in a tyre portion in correspondence of a tread area thereof (e.g., attached to the inner surface of the tyre, substantially in correspondence of the equatorial plane thereof). The piezoelectric element carries a loading mass and a small gap is present between the inner walls of the housing and the outer surface of the loading mass. The housing is associated to the tyre so that the piezoelectric element is disposed along a plane substantially orthogonal to a radial direction of the tyre.

The Applicant has also felt the necessity:
to improve the manufacture simplicity of a detecting device;
to ensure a mechanical uncoupling of the components of said device (at least of the antenna and sensor, for example) from stresses generated on the device itself, by the tyre during running;
to enable operation also within the under inflated tyre;
to enable a simple application of said device to an already manufactured tyre, without affecting the behaviour of the tyre itself;
to simplify the radio transmitter apparatus in the vehicle, reducing the number of required antennae, maintaining the operation of the above detecting device when the tyre is rolling at any speed;
to assure that data transmitted or stored by a tyre are data certainly and safely belonging to said tyre.

The Applicant has found that the above requirements can be achieved both in terms of mechanical uncoupling between the detecting unit and the tyre, and in terms of safe and reliable operation of the detecting unit itself, by inserting a detecting unit provided with at least an antenna, a sensor unit and a power supplier unit having a piezoelectric element into an anchoring body secured to the internal surface of the tyre, by providing mating surfaces between the detecting device and the anchoring body itselves.

In particular, in a first aspect, the invention relates to a tyre provided with a device for detecting at least one functional parameter in the tyre, comprising: a substantially toroidal carcass structure defining a radially internal surface of the tyre; an anchoring body secured to the radially internal surface of the tyre; a detecting unit comprising an antenna, a sensor unit operatively connected to said antenna, and a power supplier unit comprising a housing and a piezoelectric element, said power supplier unit being electrically connected with said sensor unit; wherein: the detecting unit and the anchoring body fits together by at least a rim portion engaging in a respective locking slot; said piezoelectric element is disposed within said housing so as to have a first end substantially fixed to said housing and a second end associated to a loading mass, a gap being formed between at least one inner wall of said housing and an outer surface of said loading mass; and said piezoelectric element is positioned substantially along a plane orthogonal to a radial direction of said tyre.

In a preferred embodiment, the piezoelectric element, the loading mass and the small gap are sized so as to allow: a) oscillations of the piezoelectric element substantially during a complete revolution of the tyre, when the tyre rotates at low speed; b) oscillations of the piezoelectric element substantially only when the tyre portion including the piezoelectric element is in contact with the road, when the tyre rotates at high speed. In case b), in the turn fraction in which the tyre portion including the piezoelectric element is not in contact with the road, the loading mass fixed to the piezoelectric element is urged against the inner walls of the housing by the centrifugal force developed by rotation of the tyre, so that the piezoelectric element is practically not subjected to deformation variations.

In other words, when the tyre rotates at low speed, a high quantity of electrical energy is generated by the oscillations of the piezoelectric element during a complete revolution of the tyre. The small gap and the rigidity of the piezoelectric element do not allow large deflections of the piezoelectric element, so that occurrence of cracks and/or breakings due to substantially continuous oscillation is reduced. When the tyre rotates at high speed, the high radial acceleration to which the piezoelectric element is subjected is counteracted by the contact with the inner walls of the housing for almost a complete revolution of the tyre, except during passage of the piezoelectric element in correspondence of the contact patch. This also reduces the occurrence of cracks and/or breakings in the piezoelectric material. However, energy is still generated due to substantially free oscillation of the piezoelectric element during the passage of the piezoelectric element in correspondence of the contact patch, where the radial acceleration is substantially null.

More particularly, the anchoring body comprises: a base portion carrying a fastening surface securable to the tyre; a retaining portion associated with the base portion and having a top surface facing away from the fastening surface; said locking slot comprising a perimetral groove formed between the base portion and retaining portion, whereas the detecting unit is inserted within the anchoring body through an inner perimetral edge of the antenna, fitted in said perimetral groove following elastic deformation of at least a portion of the anchoring body.

According to a preferred embodiment, the anchoring body has an overall height measured between the fastening surface of the base portion and the top surface of the retaining portion, included between about 0.2 and about 1.5 times a maximum distance measured between two mutually spaced apart points along said inner perimetral edge.

Thus, an advantageous reduction in the device masses is obtained, and consequently in the stresses induced on the device components by effect of the important accelerations due to rolling of the tyre, while keeping the possibility of giving the antenna proper sizes so as to ensure an efficient radio-frequency interaction between the detecting unit and receiving/transmitting unit installed on board the vehicle.

In the present specification and in the subsequent claims, referred to a preferential embodiment in which the antenna and anchoring body have a substantially circular conformation, some features of the device will be, for the sake of simplicity, expressed in terms of diametrical measures of the constituent elements. However, the possibility also exists of setting an antenna and/or an anchoring body extending in a non-circular conformation, e.g. of elliptic or polygonal shape. In this case, to the aims of the present specification and the following claims, each feature expressed in terms of diametrical measure is to be intended as expressed in terms of maximum distance measured between two mutually spaced apart points along the perimetral extension of the constituent element to which the same diametrical measure is referred.

In a different aspect, the present invention relates to a device for detecting at least one functional parameter in a tyre, comprising: an anchoring body securable to a radially internal surface of a tyre; a detecting unit comprising an antenna, a sensor unit operatively connected to said antenna, and a power supplier unit comprising a housing and a piezoelectric element, said power supplier unit being electrically connected with said sensor unit; wherein: the detecting unit and the anchoring body fits together by at least a rim portion engaging in a respective locking slot; said piezoelectric element is disposed within said housing so as to have a first end substantially fixed to said housing and a second end associated to a loading mass, a gap being formed between at least one inner wall of said housing and an outer surface of said loading mass; and said piezoelectric element is positioned substantially along a plane orthogonal to a radial direction of said tyre.

In a third aspect, the present invention relates to a system for monitoring at least one functional parameter in a tyre comprising: a detecting device according to the invention; and an external receiver suitable for being mounted on a vehicle for receiving data transmitted by the radio transmitter.

In accordance with a further aspect of the invention, it is proposed a method for detecting at least one functional parameter in a tyre, the method comprising: providing an anchoring body secured to a radially internal surface of a tyre; providing a detecting unit comprising an antenna, a sensor unit operatively connected to said antenna, and a power supplier unit comprising a housing and a piezoelectric element, said power supplier unit being electrically connected with said sensor unit, wherein said piezoelectric element is disposed within said housing so as to have a first end substantially fixed to said housing and a second end associated to a loading mass, a gap being formed between at least one inner wall of said housing and an outer surface of said loading mass; fitting the detecting unit with the anchoring body by engaging at least a rim portion in a respective locking slot, whereby said piezoelectric element is positioned substantially along a plane orthogonal to a radial direction of said tyre following the engaging step; rotating said tyre on a rolling surface so as to cause deformations of said piezoelectric element during said tyre rotation; collecting electrical energy generated from said deformations of said piezoelectric element; powering the sensor unit by the collected electrical energy; detecting said at least one functional parameter by said sensor unit.

BRIEF DESCRIPTION OF THE DRAWINGS

Further features and advantages will become more apparent from the detailed description of a preferred, but not exclusive, embodiment of a tyre comprising a device for detecting at least one functional parameter of the tyre itself and of a method for detecting at least one functional parameter of the tyre, in accordance with the present invention. This description will be set out hereinafter with reference to the accompanying drawings, given by way of non-limiting example, in which:

FIG. 4 shows a detecting unit being part of the detecting device, sectioned along the diametrical line IV-IV in FIG. 6;

FIG. 5 shows the detecting unit sectioned at right angles to the section plane in FIG. 4, i.e. along the diametrical line V-V in FIG. 6;

FIG. 6 shows the detecting unit seen in plan view;

FIG. 7 shows an anchoring body being part of the detecting device, sectioned along the diametrical line VII-VII in FIG. 9;

FIG. 8 shows the anchoring body sectioned at right angles to the section plane in FIG. 7, i.e. along the line VIII-VIII in FIG. 9;

FIG. 9 shows the anchoring body seen in plan view;

DETAILED DESCRIPTION OF THE INVENTION

Figure 1:
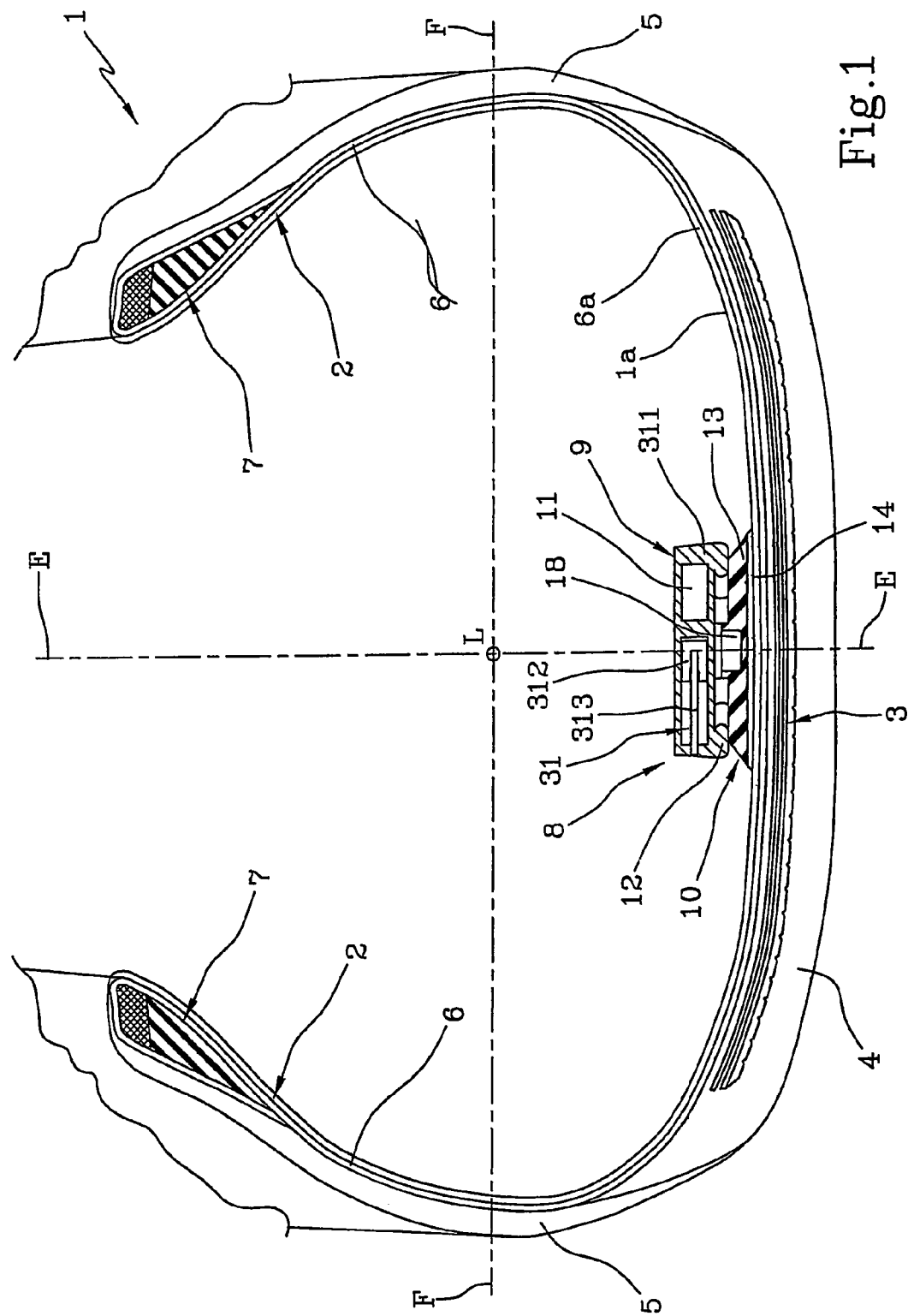
FIG. 1 diagrammatically shows a diametrical half-section of a tyre incorporating a detecting device in accordance with the present invention, sectioned along line I-I in FIG. 3.
Figure 2:
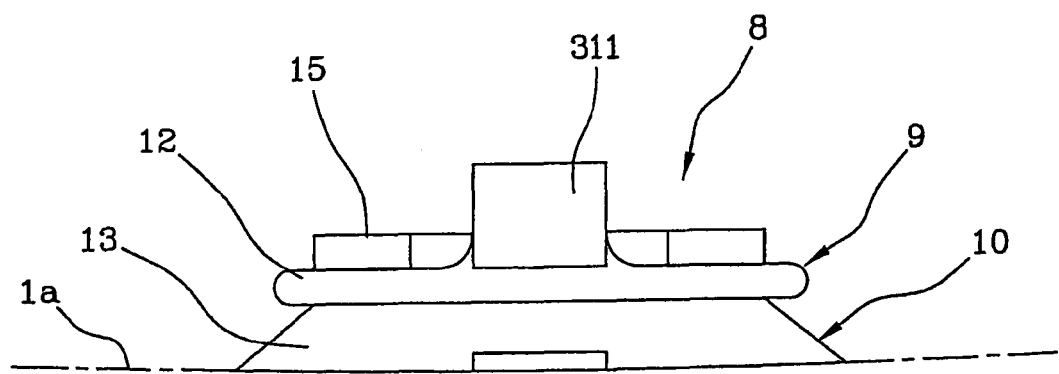
FIG. 2 shows the device in FIG. 1 seen along the direction II in FIG. 3.
Figure 3:
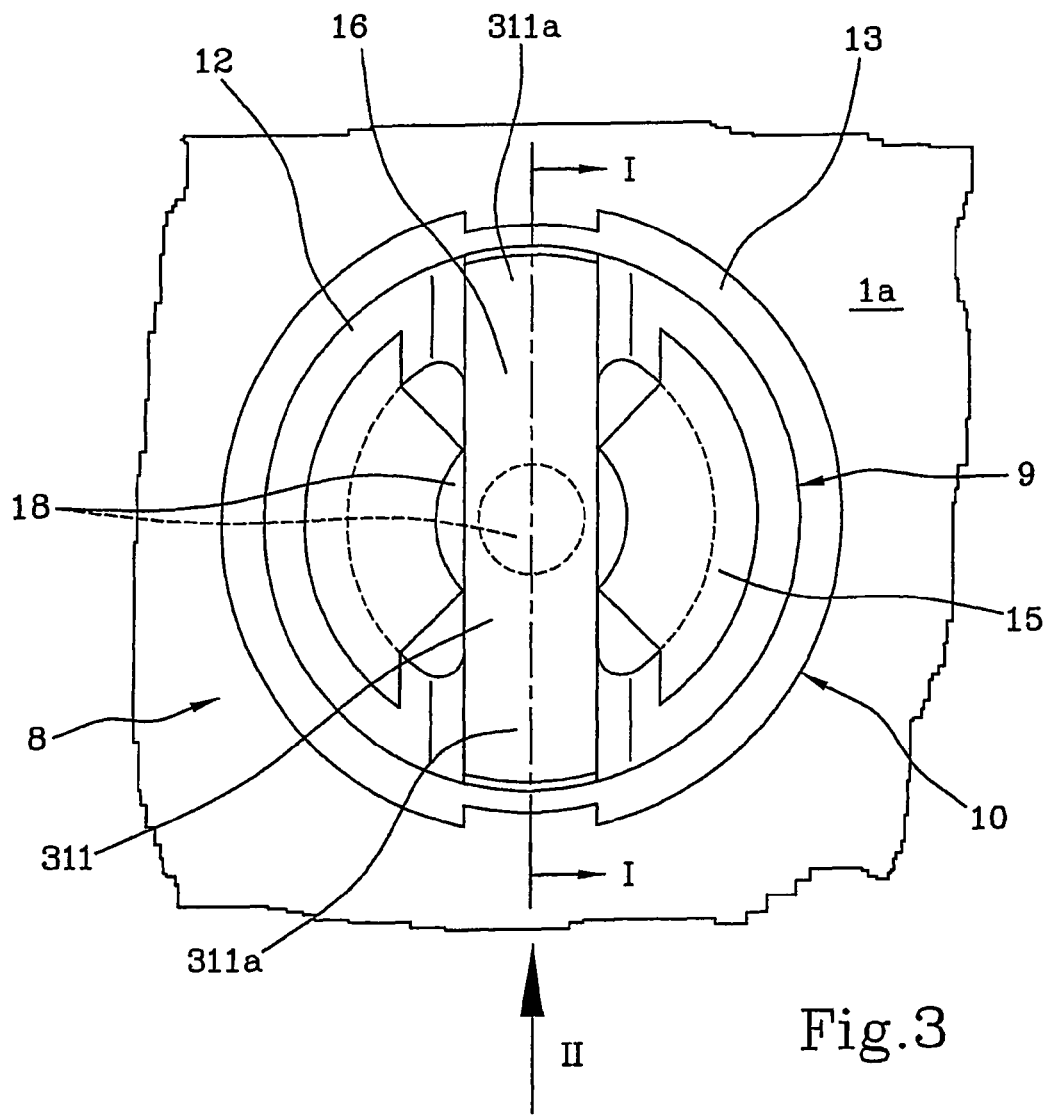
FIG. 3 is a plan view of the detecting device applied to the inner surface of the tyre.

With reference to the drawings, a tyre for vehicle wheels in accordance with the present invention has been generally denoted at 1. The tyre 11 shown in FIG. 1 is of a type conventionally known as "tubeless", i.e. it does not include an inner tube.

Tyre 1 comprises a carcass structure 2 of substantially toroidal conformation, a belt structure 3 circumferentially extending around the carcass structure 2, a tread band 4 applied to the belt structure 3 at a circumferentially external position, and a pair of sidewalls 5 laterally applied to the carcass structure 2 on opposite sides and each extending from a side edge of the tread band 4 until close to a radially internal edge of the carcass structure itself. Each of the sidewalls 5 and the tread band 4 essentially comprise at least one layer of elastomeric material of suitable thickness.

The carcass structure 2 comprises one or more carcass plies 6 having axially opposite end flaps that are steadily secured to a pair of annular anchoring structures 7, integrated into regions usually identified as tyre "beads". The carcass ply 6 can be internally coated with a so-called "liner" 6a, i.e. a thin layer of elastomeric material impervious to air or other inflating fluid usually introduced into the tyre under use conditions, which liner extends over the whole extension of the radially internal surface 1a of tyre 1.

A detecting device generally identified with B is disposed on the radially internal surface 1a of tyre 1. The detecting device 8 is located in a tyre portion in correspondence of a tread area of the tyre 1, i.e. in a portion located in the region of the tyre 1 axially extending between the sidewalls of the tyre 1. Preferably, the detecting device 8 is disposed substantially in correspondence of the equatorial plane of the tyre 1. In the preferred embodiment shown in FIG. 1, the detecting device 8 is secured to the inner liner 6a of the tyre 1.

The detecting device 8 is set to interact with an electronic unit installed on board the vehicle, not shown or further described as it can be made in a manner known by itself. Said detecting device 8 is set to detect, store and/or signal one or more functional parameters of the tyre mounted on the vehicle. These functional parameters for example can be represented by an identification code, the value of the inflating pressure, temperature, covered distance and/or other parameters also originating from mathematical calculations that can be carried out either by the detecting device 8 itself within tyre 1, or by the electronic unit on board the vehicle.

To this aim, the detecting device 8 essentially comprises a detecting unit 9 engaged with an anchoring body 10 of elastomeric material, in turn fastened against the radially internal surface 1a of tyre 1.

The detecting unit 9 essentially comprises at least one sensor unit 11 operatively associated with an antenna 12 and a power supplier unit 31 electrically connected with said sensor unit 11.

As clearly derivable from FIGS. 1-6, the antenna 12 preferably exhibits an annular conformation with circular extension, having an inner perimetral edge 12a and an outer perimetral edge 12b. The antenna 12 to be obtained by a conductive element possibly incorporated into a support of plastic material, is in the form of a flattened ring, in which the inner diameter "$d_1$" is larger, preferably 1.5 to 5 times, than the difference between the outer diameter "$d_2$" and the inner diameter "$d_1$" itself. In a preferential embodiment, the inner diameter "$d_1$" and outer diameter "$d_2$" correspond to 20 mm and 30 mm, respectively. In addition, the antenna 12 has a thickness "S" included by way of indication between 1 and 3 mm, of about 2 mm for example, measured in parallel to a geometric axis "X" of the antenna 12 itself and/or the detecting device 8 taken as a whole.

The power supplier unit 31 comprises at least one housing 311, possibly made of the same plastic material incorporating the conductive element of the antenna 12. In a preferred embodiment, the sensor unit 11 and power supplier unit 31 are incorporated into the same housing 311. The housing 311 preferably has a substantially prismatic conformation and axially projects from one side of the antenna 12 and diametrically extends relative to the antenna, joining the inner perimetral edge 12a of this latter by opposite ends 311a.

With particular reference to FIGS. 1 to 3 and 7 to 9, the anchoring body 10 preferably having a circular configuration or in any case a configuration consistent with the perimetral extension of the antenna 12, exhibits a base portion 13 provided with a fastening surface 14 anchored or susceptible of steady anchoring to the radially internal surface 1a of tyre 1.

On the opposite side from the fastening surface 14, the base portion 13 carries a retaining portion 15 having a top surface 16 facing away from the fastening surface 14 itself. Formed between the base portion 13 and retaining portion 15 is a perimetral groove 17, providing a locking slot adapted to receive a rim portion provided by the inner perimetral edge 12a of the antenna 12. Indeed, the inner perimetral edge 12a of the antenna 12 is insertable into the perimetral groove 17 following elastic deformation of the retaining portion 15.

Advantageously, the anchoring body 10, preferably made of elastomeric material having a hardness included between 35° and 60° Shore A, preferably between 40° and 55° Shore A, has an overall height "H" measured between the fastening surface 14 and top surface 16, included between about 0.2 and about 1.5 times the diameter of the inner perimetral edge 12a of the antenna 12, or in any case the maximum distance measured between two mutually spaced apart points along said inner perimetral edge 12a. Preferably, the height "H" is included between about 0.3 and about 0.6 times said maximum distance measured between two mutually spaced apart points along said inner perimetral edge 12a. In the embodiment shown, the overall height "H" corresponds to ⅖ of the inner diameter "$d_1$" of the antenna 12.

The above specified value range gives the anchoring body 10 a substantially flattened configuration which is fairly extended on the inner surface 1a of tyre 1. In this way it is possible to be sure that the centre of gravity of the detecting device 8 will keep a rather reduced distance relative to the inner surface 1a of the tyre. This fact reduces the deformations to which the anchoring body 10 is submitted by effect of the strong accelerations induced thereto during rolling of tyre 1 also at high speed, so as to eliminate the risk that the detecting unit 9 may disengage from the anchoring body 10 by effect of said stresses. Values of the $H/d_1$ ratio higher than the stated ones could in fact cause an excessive deformation capability of the anchoring body, the antenna sizes being the same, due to the centre of gravity of the detecting device 8 moving away from the radially internal surface 1a of the tyre, and also due to an increase in the device masses. The high accelerations induced during rolling of tyre 1 on the radially internal surface 1a, above all at high speed, could also generate stresses capable of causing damages and/or detachments either of the detecting unit 9 from the anchoring body 10, or of the anchoring body 10 itself from the radially internal surface 1a of the tyre. For ratio values smaller that those stated, during use of tyre 1, excessive deformations could occur at the perimetral groove 17, which would result in stresses on the detecting unit 9 that could impair the practical operation of said detecting unit 9 and/or cause separation of the latter from the anchoring body 10.

In addition, the above specified parameters enable an antenna 12 of a relatively high diameter to be utilised, to the benefit of the effectiveness of the data transmission, while at the same time enabling an advantageous reduction in the masses of the detecting device B taken as a whole.

To promote a satisfactory engagement between the detecting unit 9 and anchoring body 10, the perimetral groove 17 is preferably provided to extend according to a profile that geometrically matches the conformation of the inner perimetral edge 12a of the antenna 12. In more detail, to this aim the perimetral groove 17 has a minimum diameter "$d_m$" of a value equal to and preferably included between 97% and 103% of the inner diameter "$d_1$" of the antenna 12. Likewise, the width "$W_2$" of the perimetral groove 17, measured in parallel to the geometric axis "X", is substantially equal to and preferably included between 97% and 103% of the thickness "S" of the antenna 12. Values of minimum diameter "$d_m$" and/or width "$W_2$" of the groove 12 smaller than the above stated limits could cause relative movements and consequent shocks that can damage the detecting unit 9 and/or anchoring body 10.

To enable easy engagement and disengagement of the detecting unit 9 with and from the anchoring body 10 and at the same time ensure steadiness of the detecting unit 9 when engagement has occurred, the retaining portion 15 has an outer diameter "$d_e$" larger than the inner diameter "$d_1$" of the antenna 12. In more detail, the outer diameter "$d_e$" of the retaining portion 15 can be included, by way of indication, between 110% and 150%, and can correspond to about 125% for example, of the inner diameter "$d_1$" of the antenna 12. In addition, the retaining portion 15 has a height "$W_3$" measured in parallel to the geometric axis "X", included between 90% and 140%, and equal to about 125% for example, of the width "$W_2$" of the perimetral groove 17.

Values of outer diameter "$d_e$" and/or height "$W_3$" smaller than the stated values could cause an excessive weakening of the retaining portion 15. Vice versa, values of outer diameter "$d_e$" and/or height "$W_3$" higher than the stated values would make fitting of the inner circumferential edge of the antenna 12 into the groove 17 too difficult.

To facilitate this fitting operation, it is also preferable for the outer diameter "$d_2$" of the antenna 12 to be larger than the outer diameter "$d_e$" of the retaining portion 15.

It may be also advantageously provided that a central cavity 18 extending from the top surface 16 towards the fastening surface 14 be formed in the anchoring body 10. The presence of the central cavity 18 allows deformability of the retaining portion 15 to be optimised to facilitate coupling of the anchoring body 10 with the detecting unit 9.

Preferably, the central cavity 18 has an axial extension at least equal to the axial size, i.e. height "$W_3$", of the retaining portion 15 added to the axial size, i.e. width "$W_2$", of the perimetral groove 17. In the embodiment shown the central cavity 18 extends as far as about 2 mm from the fastening surface 14.

Preferably identifiable in the central cavity 18 is a primary portion 18a extending from the top surface 16 and having a diameter "$N_1$" smaller than the inner diameter "$d_m$" of the perimetral groove 17, and an end portion 18b of a diameter "$N_2$" smaller than the diameter of the primary portion 18a. At least at the primary portion 18a, the diameter "$N_1$" of the central cavity 18 corresponds, by way of indication, to 60% of the inner diameter "$d_m$" of the perimetral groove 17, and in any case is preferably included between 40% and 70% of the inner diameter "$d_m$" of the groove itself. It is also preferably provided that, at least at the primary portion 18a, the ratio of the diameter "$N_1$" of the central cavity 18 to the outer diameter "$d_e$" of the retaining portion 15 be larger than about 0.3 and preferably included between about 0.3 and about 0.7. For values smaller than 0.3, the deformability of the retaining portion 15 may be reduced too much for carrying out the engagement and disengagement operations of the detecting unit 9, with and from the anchoring body 10. In the embodiment shown, the ratio of the diameter "$N_1$" of the central cavity 18 to the outer diameter "$d_e$" of the retaining portion 15 is substantially equal to 0.5.

The ratio between the diameters "$N_2$" and "$N_1$" of the end portion 18b and the primary portion 18a is preferably included between 0.2 and 1. For higher values, the fitting constraint between the detecting unit 9 and anchoring body 10 can be too yielding. On the contrary, for smaller values the deformability of the retaining portion 15 can be insufficient to carry out the engagement operations of the detecting unit 9 with the anchoring body 10. In the embodiment shown, this ratio is substantially equal to 0.5.

One or more recesses 19 can be also advantageously formed at diametrically opposite positions in the retaining portion 15, for housing the sensor unit 11 and power supplier unit 31. Each recess 19 opens towards the central cavity 18 and preferably extends around the geometric axis "X" of the anchoring body 10 by an angle "β" of a width included by way of indication between about 30° and about 100°, and substantially equal to 60° in the embodiment shown. The sizes and shape of the recess 19 are adapted to enable an optimal matching between the shape of the retaining portion 15 and that of the housing 311 that preferably contains both the sensor unit 11 and power supplier unit 31, so that plays or undesirable stresses with respect to the retaining portion 15 itself are eliminated.

Width values of angle "β" smaller than the stated values could cause an undesirable reduction in the deformability of the retaining portion 15. Higher width values could bring to an excessive weakening of the engagement constraint between the detecting unit 9 and anchoring body 10.

Advantageously the base portion 13 is such structured that it conveniently protects the detecting unit 9 from stresses to which tyre 1 is submitted at the ground-contacting area, any risk of direct contact between the detecting unit 9 and the radially internal surface 1a of the tyre being eliminated.

To this aim, the base portion 13 is preferably provided to extend in a tapering conformation towards the perimetral groove 17, according to a height extension "$W_1$" measured in parallel to the geometric axis "X", that is included between 40% and 50% of the overall height "H" of the anchoring body 10. In more detail, the base portion 13 has a perimetral surface 13a tapering towards the perimetral groove 17, by an angle "α" included between about 15° and about 45°, corresponding to about 30° for example, relative to a plane containing the perimetral groove 17 itself. With angles smaller than 15° the perimetral surface 13a, due to deformations induced during rolling of the tyre, could come into contact with the antenna 12 thereby bringing about risks of damages and/or disengagements of the detecting unit 9 from the anchoring body 10. Angles of a value exceeding 45° would impose a reduction in the extension of the fastening surface 14, thereby impairing steadiness of adhesion to the radially internal surface 1a of the tyre. In addition, angles of a value exceeding 45° could generate points of stress concentration, due to the sudden stiffness variation induced by the presence of the anchoring body 10 itself, at the perimetral edge of the fastening surface 14, with consequent risks of giving rise to phenomena of separation of the anchoring body 10 from the radially internal surface 1a of the tyre.

It is also provided that the ratio of the overall height "H" of the anchoring body 10 to the maximum diameter "$D_{max}$" of the base portion 13 at the fastening surface 14 be preferably included between about 0.2 and about 0.3, in the example shown being equal to 0.24. In addition, the maximum diameter "$D_{max}$" is preferably included between 110% and 120% of the outer diameter "$d_2$" of the antenna 12. Smaller values of maximum diameter "$D_{max}$" as compared with the stated ones could induce an excessive deformability of the anchoring body 10 during rolling of the tyre, and, as a result, a reduction in the mechanical adhesion grip between the fastening surface 14 and inner surface 1a of the tyre itself. Higher values on the contrary would cause an increase in the transmitted forces between the tyre and anchoring body 10, due to the stiffness increase of said anchoring body 10, and would involve the risk of contacts between the radially external edge of the antenna 12 and the tapered perimetral surface 13a of the base portion 13.

It is also provided that at least at the perimetral groove 17 the base portion 13 should have a minimum diameter "$D_{min}$" included between the inner diameter "$d_1$" of the antenna 12 and the outer diameter "$d_e$" of the retaining portion 15. Higher values would transmit stresses to the antenna 12 during rolling of tyre 1, that would tend to remove the detecting unit 9 from the anchoring body 10.

In addition and advantageously, the fastening surface 14 of the base portion 13 may have a curvilinear extension, the radius of curvature of which is by way of indication at least as long as 280 mm when a tyre size 205/55 R16 is concerned, said curvilinear extension preferably corresponding to the curvature of the radially internal surface 1a of the tyre under inflated conditions.

To promote deformability of the anchoring body 10 in the interface between the fastening surface 14 and radially internal surface 1a of the tyre, the base portion 13 preferably has an auxiliary groove 20 formed in the fastening surface 14 and extending transversely of the circumferential extension of the tyre. In addition, this auxiliary groove 20 extends in a direction lying in a plane containing the recesses 19, for a depth included by way of indication between about 0.8 and about 2 mm.

Figure 10:
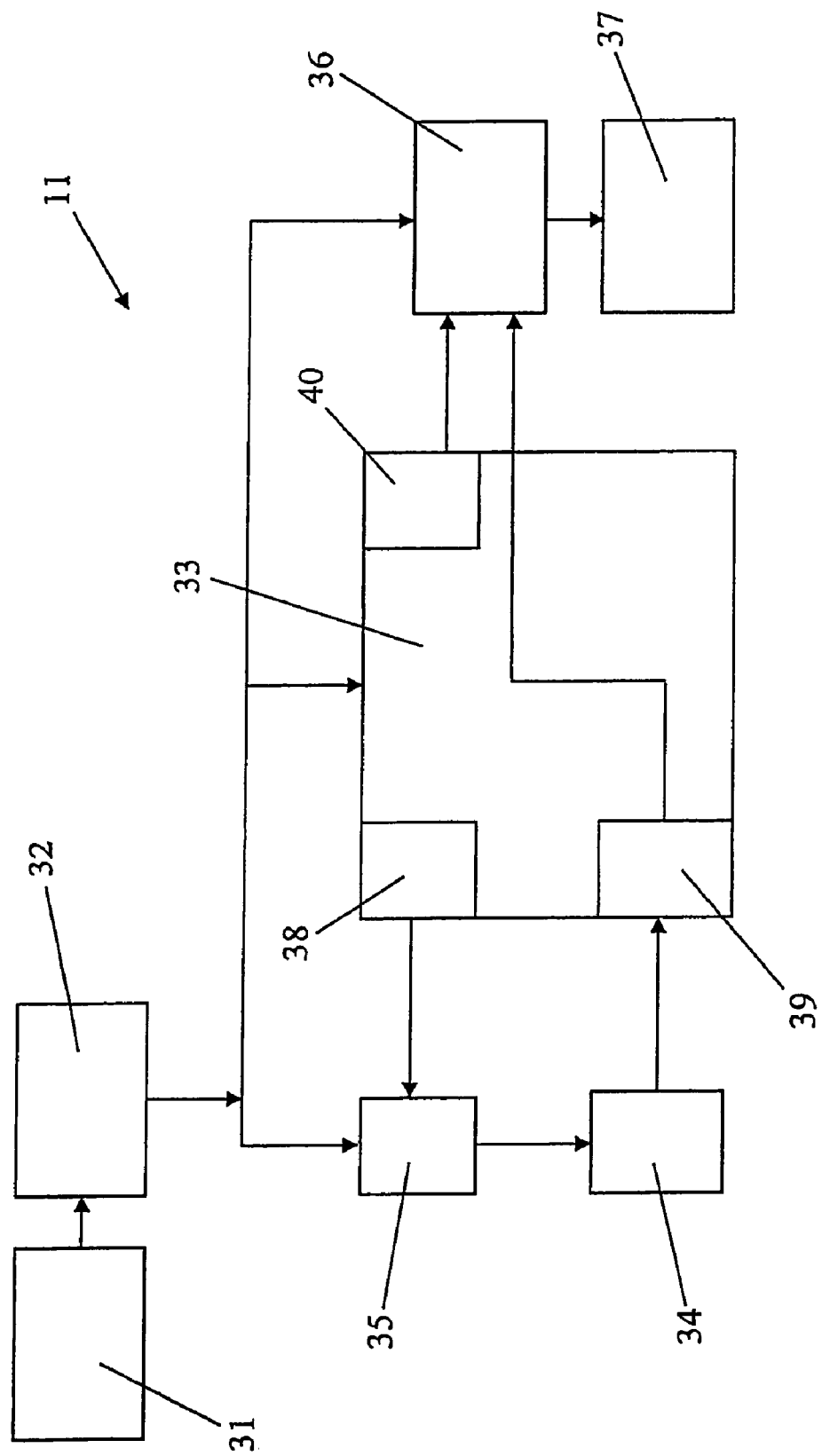
FIG. 10 shows an exemplary scheme of a detecting unit to be included in the tyre of FIG. 1.

A blocks diagram of an exemplary detecting unit 9 is shown in FIG. 10. The sensor unit 11 is provided with at least a micro-controller 33. In a preferred embodiment, the sensor unit 11 preferably comprises a micro-controller 33, a measurement device 34, and a radio-frequency transmitter 36.

The power supplier unit 31 comprises a flexing piezoelectric element 313, as it will be described in detail in the following, which deforms under the forces transmitted to it by the tyre during rolling on the road. Due to piezoelectric effect, such deformations generate electrical charge, which can be collected by suitable electrodes and fed to a voltage preparation circuit 32, typically including a diode rectifier bridge (not shown), being adapted to transform an alternate current in a direct current. The voltage preparation circuit 32 also includes a capacitor (not shown), or other device suitable for storing the electrical charge generated by piezoelectric effect. The voltage preparation circuit 32 may also comprise a voltage controller (not shown), being adapted to verify that a voltage across the capacitor is above a predetermined minimum (e.g. 2.7 Volt). The electrical power generated by the power supplier unit 31 and stored in the voltage preparation circuit 32 is fed to the sensor unit 11, namely to the micro-controller 33, to the measurement device 34 (via switch 35) and to the radio-frequency transmitter 36.

The measurement device 34 comprises one or more sensors adapted to measure the tyre parameter or parameters to be monitored, such as for example pressure and/or temperature. The measurement device 34 also may include control circuitry adapted to transform the sensed parameters in electrical signals. The radio-frequency device 36 is adapted to transmit, via the antenna 12, information frames containing the measured parameter or parameters, to a receiver (not shown) external to the tyre, typically located on the vehicle to which the tyre is fit. The micro-controller 33 typically comprises a memory and a CPU that controls operation of the detecting unit 9. In the preferred embodiment shown in FIG. 2, the micro-controller 33 enables, via a first enabling circuit 38, the switch 35 to close the circuit towards the measurement device 34, in order to energize the same for carrying out the measurement of the functional parameter or parameters to be monitored.

Furthermore, the micro-controller 33 enables, via a second enabling circuit 40, the transmission of the frames to the external receiver. Moreover, the micro-controller 33 collects the signals coming from the measurement device 34, converts them, via an analog/digital converter 39, in a digital form, and processes them in order to extract the information to be sent outside the tyre via the radio-frequency transmitter 36.

The enabling of the closure of the switch 35, as well as the enabling of the frame transmission by transmitter 36, may be performed at predetermined time intervals. For example, the first enabling circuit 38 may drive the closure of the switch 38 every two minutes, whereas the second enabling circuit 40 may enable transmission of collected data to the outside every seven minutes, since radio-frequency transmission typically requires more power with respect to parameter measurements.

In a preferred solution, the closure of the switch 38 and, if desired, the transmission of collected data, is enabled to provide a power pulse, every time the amount of electrical energy collected in the voltage preparation circuit 32 reaches a predetermined threshold value. The micro-controller 33 may be arranged for counting the power pulses provided to the sensor unit, and storing in said memory a functional parameter representative of the counted power pulses.

The first and/or second enabling circuits 38, 40 may be realized in any conventional manner, as hardware circuits separate from the micro-controller 33, or as software objects integrated within the memory of the micro-controller 33.

Figure 11:
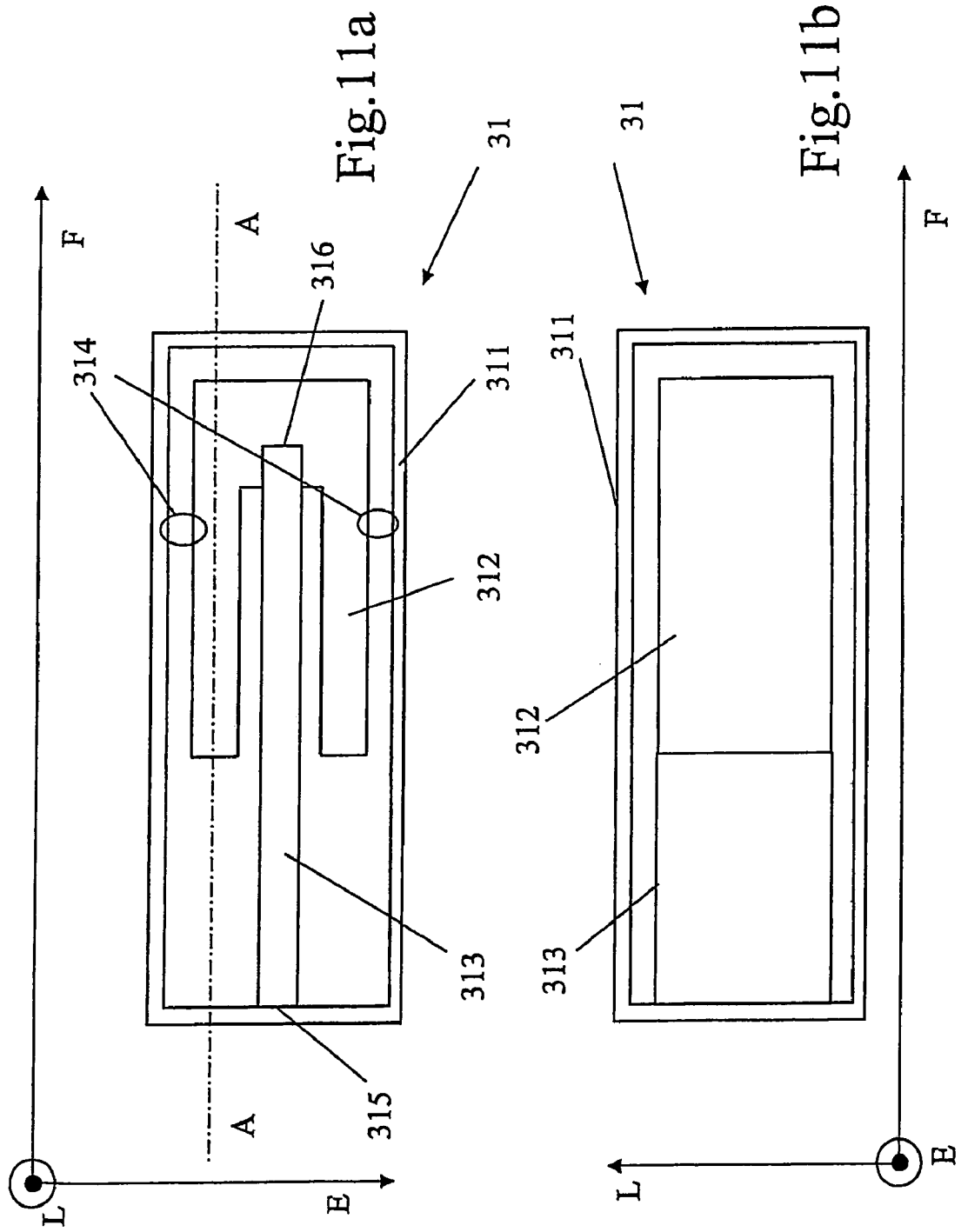
FIGS. 11a and 11b show an exemplary flexing piezoelectric element to be included in the detecting unit of FIG. 10 for power supply.

FIG. 11a shows a lateral cross-section of the power supplier unit 31. The power supplier unit 31 comprises a piezoelectric element 313 and a loading mass 312 associated to the piezoelectric element. FIG. 11b shows a view of the power supplier unit 31 along the section indicated as A-A in FIG. 11a. With reference to FIG. 11a, the piezoelectric element is disposed within the housing 311 in cantilever-fashion. In other words, the piezoelectric element 313 is fixed at a first end 315 thereof to the housing 311, whereas the second end 316 is associated to the loading mass 312.

The piezoelectric element is preferably formed as a planar element. Alternatively, it can be formed as a reed element, or as a bar element. In preferred embodiments, a planar piezoelectric element comprises at least two planar piezoelectric crystals, separated by a planar, electrically conductive (e.g., metallic) plate (bimorph configuration). Electrodes are conventionally disposed on the outer surfaces of the piezoelectric elements.

The detecting device 8 is associated to the tyre so as to dispose the piezoelectric element 313 along a plane substantially orthogonal to a radial direction of the tyre (indicated as "E" in FIG. 1, 11a, 11b), i.e., a direction radiating from the rotation axis of the tyre. In such way, the piezoelectric element 313 and the associated loading mass 312 are subjected, during rolling of the tyre, to the radial (i.e. centrifugal) acceleration. In order to uniformly distribute the stress undergone by the piezoelectric element 313, the longer side of the piezoelectric element 313 may be preferably disposed substantially according to an axial direction of the tyre (indicated as "F" in FIG. 1, 11a, 11b), i.e. a direction parallel to the rotation axis of the tyre. Alternatively, the longer side of the piezoelectric element may be disposed according to a longitudinal direction of the tyre (indicated as "L" in FIG. 1, 11a, 11b).

The geometrical dimensions of the piezoelectric element 313, of the loading mass 312 and of the housing 311 are chosen so as to leave an interspace 314, also called "gap", between the outer surface of the loading mass 312 and the inner walls of the housing 311, that defines a maximum deflection allowed to the piezoelectric element 313. In order to limit the dimensions of the power supplier unit 31 and to shift the centre of mass of the piezoelectric element+loading mass structure substantially at the second end of the piezoelectric element 313, the loading mass 312 may preferably be U-shaped, as shown in FIG. 11a.

Figure 12:
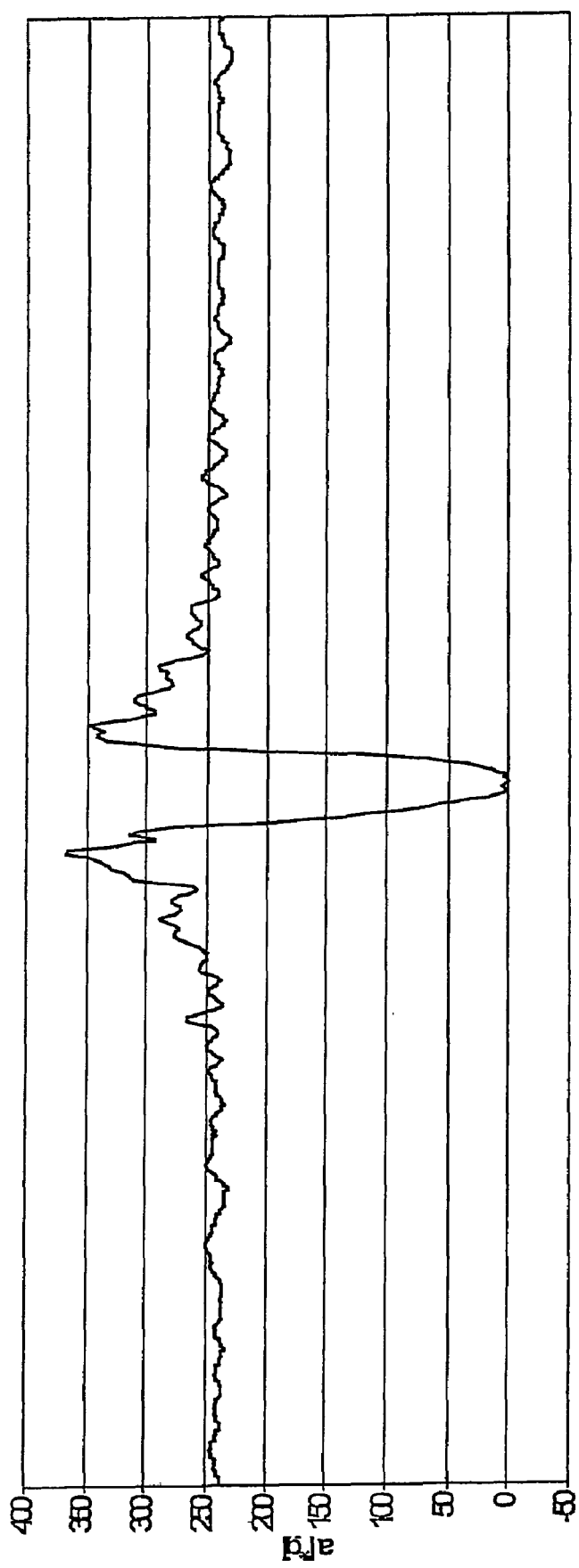
FIG. 12 shows a typical curve of radial acceleration versus time to which a tread area portion of a tyre is subjected during a tyre turn.

In operation, the power supplier unit 31 is subjected to the centrifugal acceleration which develops due to the tyre rotation. The centrifugal acceleration is mixed with other acceleration contributions that come from the interaction of the tyre with the ground during rolling. FIG. 12 shows an exemplary profile of a resulting radial acceleration versus time to which the tyre portion wherein the power supplier unit 31 is associated may be subjected during a tyre revolution.

During a first fraction of a complete tyre revolution, during which the tread area corresponding to the tyre portion where the power supplier unit 31 is associated is not in contact with the ground, the acceleration is substantially constant, except for the ripples visible in FIG. 12, the presence of which will be explained in the following, and assumes a value depending on the square of the tyre rotation speed. During a second fraction of a complete tyre revolution, during which the tread area corresponding to the tyre portion where the power supplier unit 31 is associated is in contact with the ground, the acceleration level drops to substantially zero, as it can be seen in the central portion of FIG. 12, after an initial increase due to a deformation to which the tyre is subjected during the passage from a circumferential to a flat configuration, at the very beginning of the contact region between tyre and ground. A further increase of the acceleration level is encountered by the tread area at the exit of the contact region.

During the above mentioned first fraction of a complete tyre revolution, the power supplier unit 31 associated to the tyre portion in correspondence of the tyre tread area can be subjected to a tremendous acceleration (as absolute values but also as a suddenly changing during the tire revolution), that can reach values of several hundreds g at high speed (e.g. 360 g at 120 km/h). Subject to this acceleration, which is directed substantially along direction E in FIGS. 11a and 11b, the loading mass 312 is pushed away from a first equilibrium position, in which the piezoelectric element is practically orthogonal to a radial direction of the tyre, towards the inner walls of the housing 311, to an extent that is dependent on the compliance characteristics of the piezoelectric element 313 and on the size of the loading mass 312, a maximum extent being defined by the gap 314. The movement of the loading mass 312 causes a corresponding flexing the piezoelectric element 313, i.e., generation of electric charge, due to piezoelectric effect. However, under this "static" acceleration, the generation of electric charge is suddenly interrupted as soon as the loading mass reaches a second equilibrium position, that may be within the gap 314 or against the inner walls of the housing 311, depending on the acceleration value, i.e. on the tyre rotation speed. The more the rotation speed, the more the second equilibrium position is far from the first equilibrium position, up to a maximum defined by the gap 314, as said before.

On the other hand, during the above mentioned second fraction of a complete tyre revolution, i.e. during the passage in the contact region with the ground of the tyre portion to which the power supplier unit 31 is associated, the loading mass 312 is left free to oscillate, due to the fact that the acceleration drops to substantially zero, so that no force acts anymore to keep the loading mass 312 in the second equilibrium position. The oscillations of the loading mass 312 cause a corresponding flexing of the piezoelectric element 313, i.e. generation of electric charge, due to piezoelectric effect. These oscillations may furnish a high quantity of electric charge, in dependence of the extent of the oscillation and of the damping effect imposed from the damping characteristics of the piezoelectric element 313. However, as soon as the passage in the contact patch terminates, the centrifugal acceleration causes a forced stopping of the oscillations, with a positioning of the loading mass at the second equilibrium position, and a corresponding stopping of the generation of electric charge.

The total quantity of generated electric charge in the second fraction of a complete tyre revolution is the result of many effects, some of them counteracting with each other:

a) at low speed, the extent of the oscillation is quite low; however, every passage under the contact patch is quite long, so that a high number of oscillations (i.e. of deformations of the piezoelectric element 313) may be obtained, if the damping imposed by the piezoelectric element 313 is suitably chosen;

b) at high speed, the extent of the oscillation is higher, with a maximum defined by the gap 314; however, every passage under the contact patch has a lower duration with respect to case a) above, so that the number of oscillations is lower; therefore, by suitably choosing the structural, geometric and/or physical features of the piezoelectric element 313 and loading mass 312, a predetermined amount of electric energy may be produced by the piezoelectric element 313 for each revolution of the tyre, irrespective of the tyre revolution speed; in addition, in a given time interval the number of passages under the contact patch is higher with respect to case a), so that a compensation may be obtained, counteracting the lower duration of each passage.

The behaviour of the piezoelectric element 313 associated to the loading mass 312 explained hereinabove refers to a so-called "first harmonic" contribution of the acceleration to which the power supplier unit 31 is subjected, i.e. a contribution that occurs once per tyre turn. The frequency associated to such contribution may vary in a low frequency range from 0 Hz to few tens of Hz, depending on the tyre rotation speed (e.g. about 20-25 Hz, for a car tyre at a speed around 150 km/h), corresponding to the number of passages of the tyre portion associated to the power supplier unit 31 under the contact patch in one second. Due to such low frequency contribution, a "pulsed" generation of electric charge may be obtained, as a result of the "pulsed" oscillating behaviour of the piezoelectric element 313, with a "pulse frequency" depending on the tyre rotation speed.

However, the actual acceleration to which the power supplier unit 31 is subjected in radial direction has also components in frequency ranges higher than those mentioned above, as it can be seen from the presence of the ripples exhibited by the radial acceleration profile shown in FIG. 12. These high frequency components are due to harmonic contributions of higher order, i.e. to events occurring more than once per tyre turn. For example, a higher order harmonic contribution may be due to the interaction with the road of the blocks forming the tyre tread. Other higher order harmonic contributions may come from vibrational modes of the whole tyre structure due to the transmission of the deformations to which the tyre is subjected under the contact patch to tyre portions outside of the contact patch. Further high frequency contributions may be caused by the interaction of smaller tread portions with the road, that may depend on the granularity of the terrain (e.g. asphalt) on which the tyre is rolling.

Figure 13:
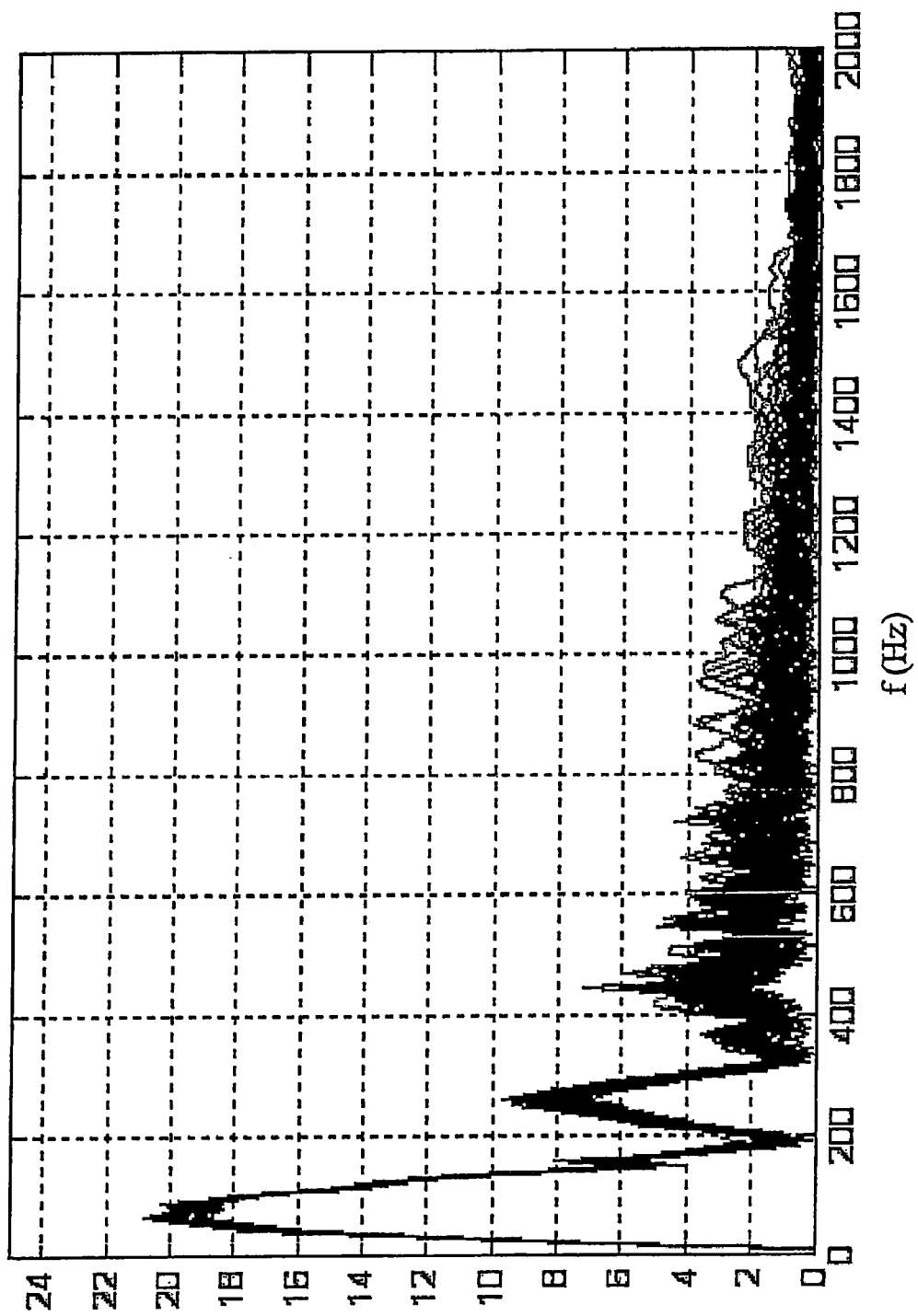
FIG. 13 shows a typical frequency spectrum of a radial acceleration curve such as that shown in FIG. 12.

Exemplarily, FIG. 13 shows the result of a Fourier transformation of a radial acceleration signal obtained by an accelerometer attached to the inner liner of a tyre (Pirelli P7 195/65 R15, inflated at 2.2 bar) rolling at a rotation speed of 80 km/h for several turns. FIG. 13 shows different superimposed curves, each one being related to the acceleration signal obtained in a single turn. In abscissa, the frequency (in Hz) of the different acceleration components is reported, whereas in ordinate the sum of possible different contributions at the same frequency is reported (in arbitrary units). As it can be seen, a major contribution is obtained for frequencies up to about 200 Hz. The curves corresponding to the different tyre turns are well superimposed in this first frequency range, corresponding, according to the Applicant, to a behaviour related practically only to the tyre structure, i.e. to the response of the tyre structure to the stress imposed by the rolling on the ground, and not to external factors (such as, for example, the kind of asphalt on which the tyre is rolling). At lower speed, the first frequency range has a lower width, and, correspondingly, the peak shown in FIG. 13 occurs at a lower frequency (e.g., about 50 Hz at 40 km/h). At higher frequencies, the contributions are lower and lower, and show a random behaviour, represented by the increasing spreading of the different curves visible for frequencies higher than about 200-400 Hz, possibly due to rolling on different road conditions. Anyway, the different frequency components of the radial acceleration may give other contributions to the deformations of the piezoelectric element 313, further to the deformations obtained by the above mentioned first harmonic contributions.

Figure 14:
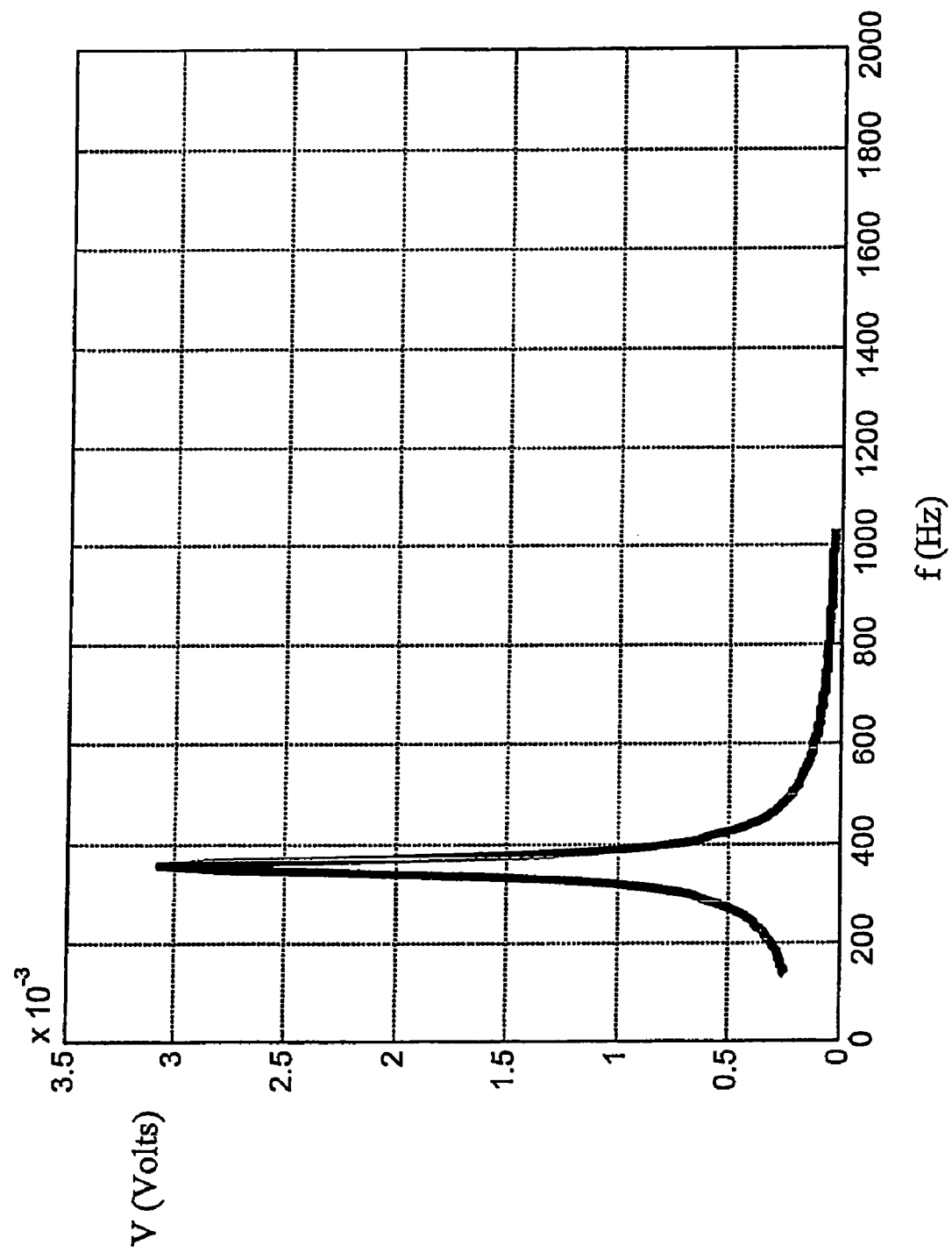
FIG. 14 shows an exemplary frequency response of the flexing piezoelectric element of FIGS. 11a and 11b.

By way of comparison, FIG. 14 shows the frequency response of an exemplary piezoelectric element 313 associated to a loading mass 312. The dimensions and material of the piezoelectric element 313 were chosen so as to obtain a stiffness k thereof of about 4800 N/m. The loading mass 312 m was sized to about 0.96 grams. In order to obtain the frequency response, the housing comprising the piezoelectric element associated to the loading mass was disposed on a shaker device driven by a control electronics, that applied a pulsed exciting force to the shaker, in a frequency range between 0 Hz and 1000 Hz. The movement of the shaker caused oscillations of the loading mass and of the piezoelectric element, with consequent generation of electric charge. FIG. 14 reports the transfer function voltage/acceleration (expressed in terms of g), versus the frequency the exciting force. As it can be seen from FIG. 14, a resonance peak of the structure formed by the piezoelectric element and by the loading mass is between 300 Hz and 400 Hz, i.e. quite far from the peak shown in FIG. 13. This means that, in practice, during rolling of the tyre the excitation force transmitted by the tyre to the power supplier unit 31 comprising the cantilever-fashion piezoelectric element 313 cannot substantially cause resonant oscillation of the piezoelectric element 313. This fact is important in order to reduce the occurrence of cracks in the piezoelectric material, that could be caused by continuous large oscillations of the piezoelectric element 313, with consequent reduction of the efficiency of the power supplier unit 31, or, in the worst cases, with early breaking of the piezoelectric element 313.

Even if not resonating, the piezoelectric element 313 is anyway excited by the components of the radial acceleration having frequency higher than the frequency of the "first harmonic". The Applicant has verified that when the tyre is rolling at low speed, i.e. when the centrifugal acceleration developed by the tyre rotation is not so strong to practically cancel out all the other frequency components of the radial acceleration, the loading mass 312 associated to the piezoelectric element 313 oscillates around the above mentioned second equilibrium position, i.e. the position reached by the loading mass when pushed by the centrifugal acceleration. Such oscillation, due to the "high frequency" components (i.e. components due to higher order harmonics and/or components due to interaction between tyre tread and road), is very beneficial for the generation of electric charge by piezoelectric effect. Actually, due to such oscillations, a continuous flow of electric charge is generated during the above mentioned first fraction of a complete tyre revolution (i.e., the portion outside the contact patch), that, summed to the electric charge generated during the above mentioned second fraction of a complete tyre revolution (i.e. the contact patch), contributes to form a "continuous" generation of electric charge during the whole tyre turn.

As said, such behaviour occurs at low speed. At higher speed, the developed centrifugal acceleration becomes so strong, with respect to the other components forming the radial acceleration, that the loading mass 312 is urged against the inner walls of the housing 313 and any movement of the same is practically inhibited. In such situation, electric charge is, anyway, generated in the second fraction of tyre turn.

Figure 15:
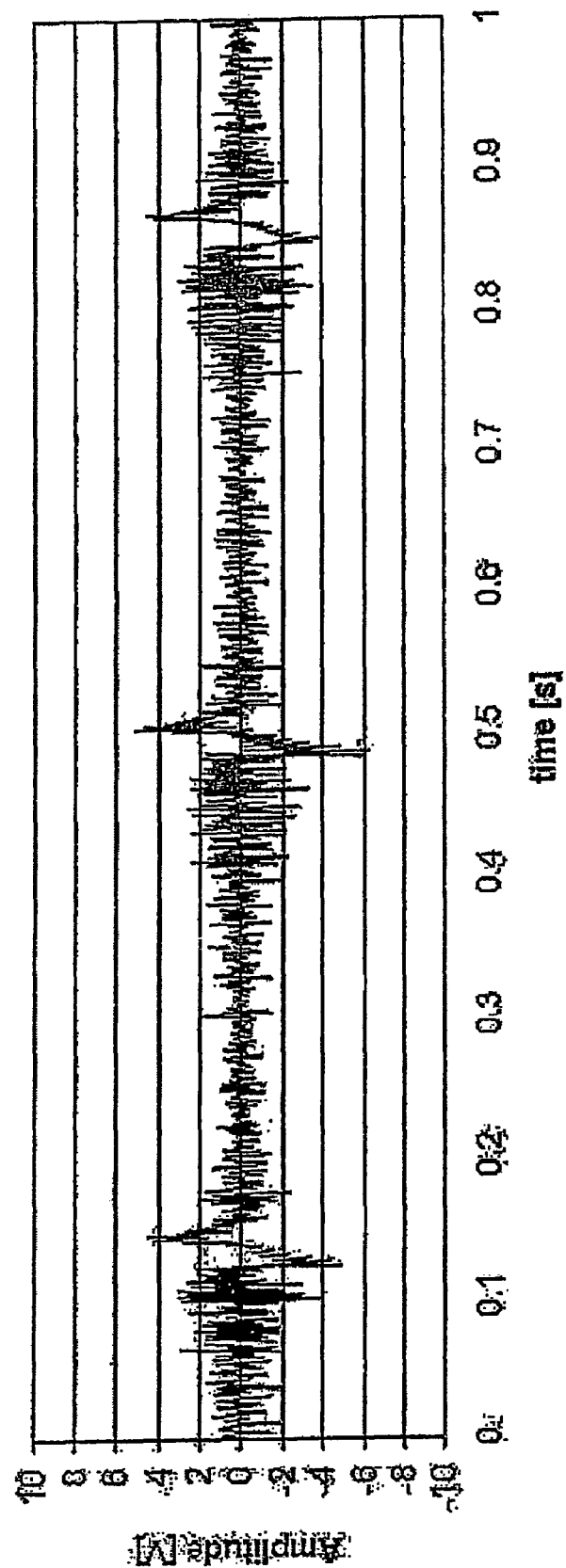
FIG. 15 shows a signal obtained from the flexing piezoelectric element of FIGS. 11a and 11b mounted on a tyre rotating at a speed of 20 km/h.
Figure 16:
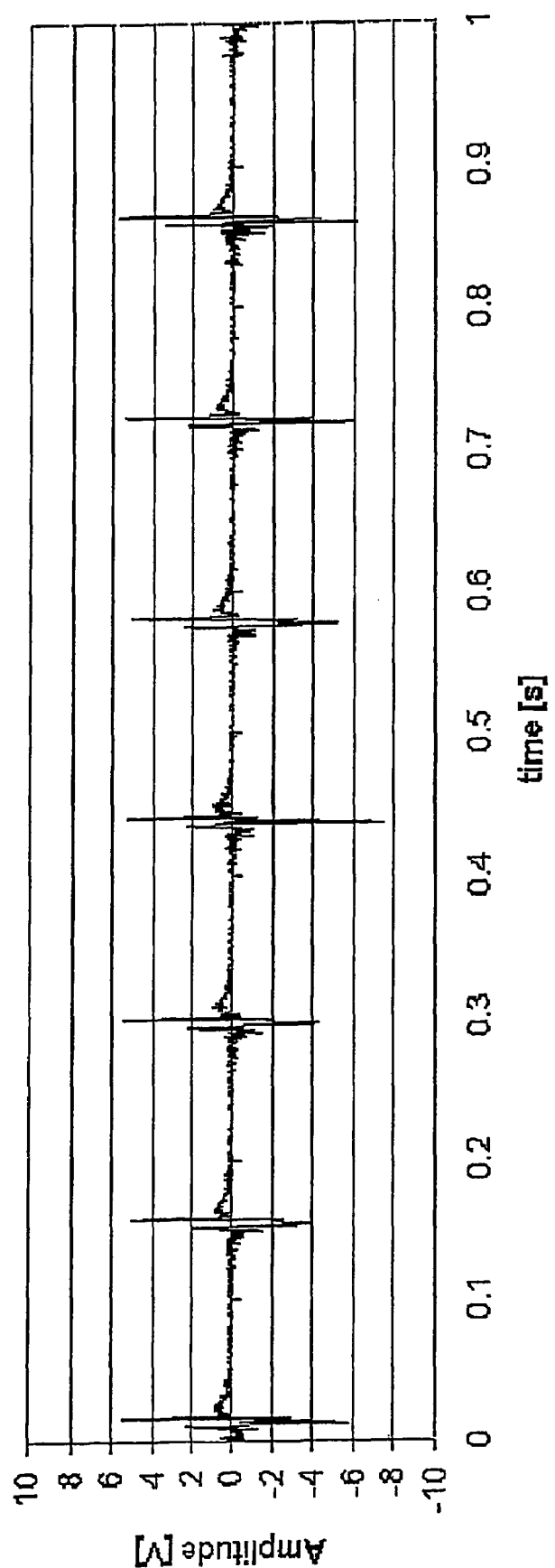
FIG. 16 shows a signal obtained from the flexing piezoelectric element of FIGS. 11a and 11b mounted on a tyre rotating at a speed of 50 km/h.

FIG. 15 and FIG. 16 show this different behaviour of the power supplier unit 31. More particularly, both figures show the voltage versus time generated by a power supplier unit attached with an elastomeric patch to the inner liner of a tyre, the power supplier unit being formed by including a bimorph plate of piezoelectric material (PZT), having a width of 5 mm, a length of 11 mm, an overall thickness of 0.46 mm in a plastic housing having width of 7 mm, a length of 13 mm, a height of 7 mm, a thickness of 0.5 mm. A loading mass of 0.97 gr. was fixed to the free end of the piezoelectric plate. A gap of 250 µm was left in radial direction between the inner walls of the housing and the outside surface of the loading mass (125 µm+125 µm).

FIG. 15 shows the voltage versus time obtained by such power supplier unit when the tyre rotated at 20 km/h. Three strong voltage oscillations are visible, corresponding to the passages of the tyre portion associated to the power supplier unit under the contact patch, with a superimposed continuum of smaller voltage oscillations extending across the whole time interval. Clearly, voltage oscillations are due to actual oscillations of the piezoelectric plate, that occur both when the tyre portion associated to the power supplier unit is outside the contact patch, and when the tyre portion associated to the power supplier unit is within the contact patch.

FIG. 16 shows the voltage versus time obtained by the power supplier unit when the tyre rotates at 50 km/h. The number of strong voltage oscillations increases, due to the higher rotation speed. However, the smaller voltage oscillations have practically disappeared, so that the generated voltage signal is similar to a pulsed signal, with bursts separated from each other. In this second case, the electric charge is generated practically only when the tyre portion associated to the power supplier unit is within the contact patch.

Figure 17:
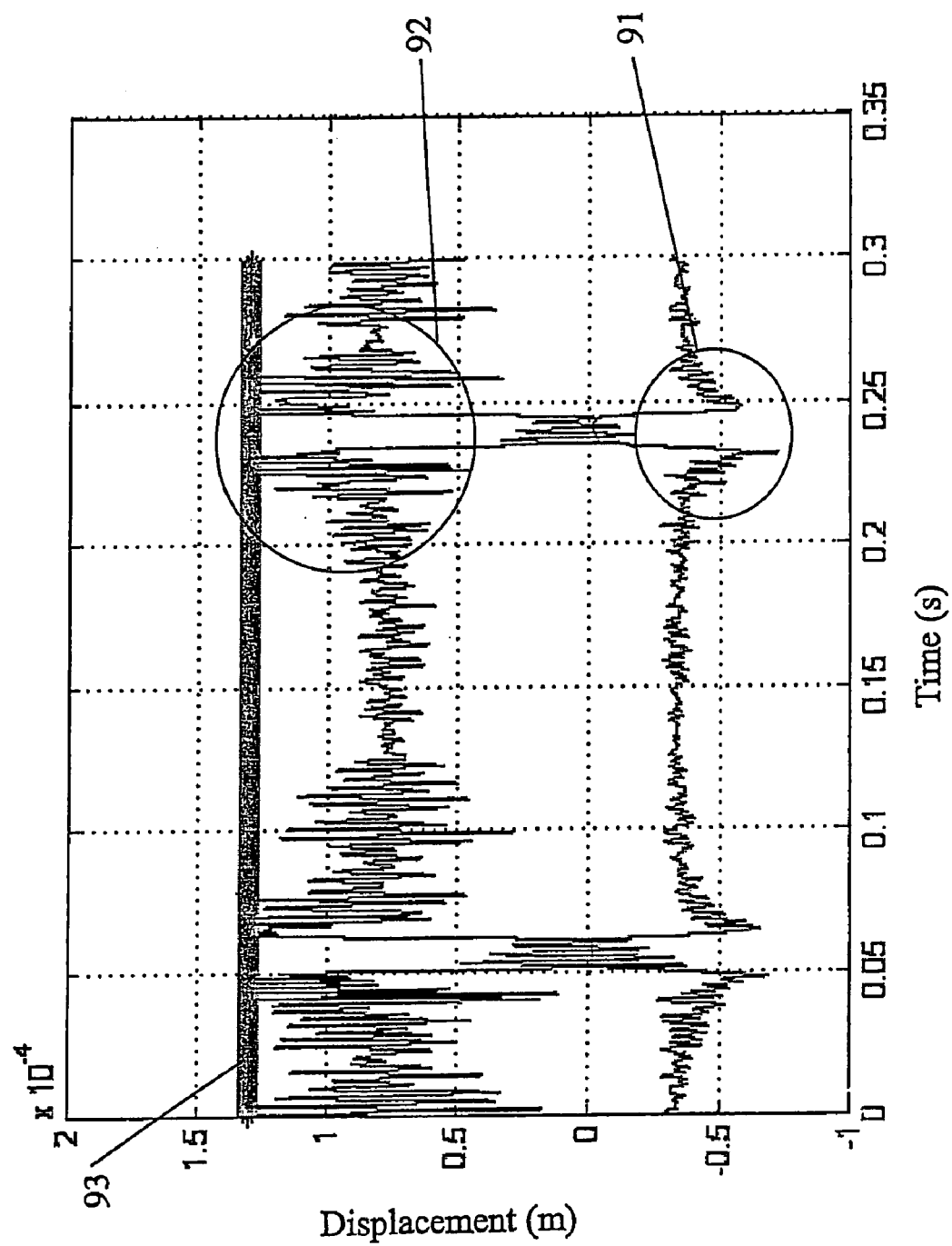
FIG. 17 shows the displacement versus time to which the loading mass fixed to flexing piezoelectric element of FIG. 11a and 11b is subjected during rotation of the tyre at low speed (40 km/h)
Figure 18:
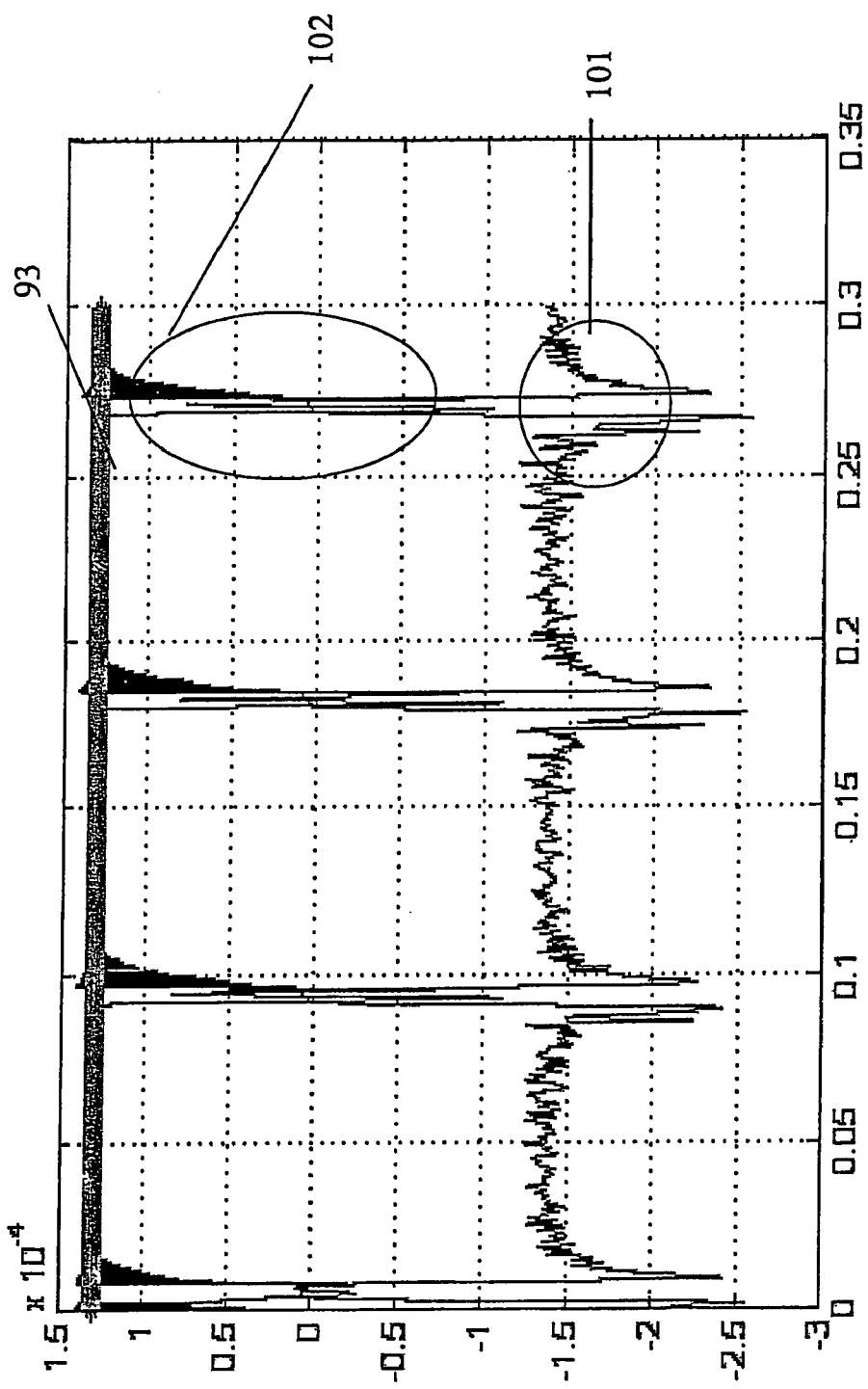
FIG. 18 shows the displacement versus time to which the loading mass fixed to flexing piezoelectric element of FIG. 11a and 11b is subjected during rotation of the tyre at high speed (80 km/h)
Figure 19:
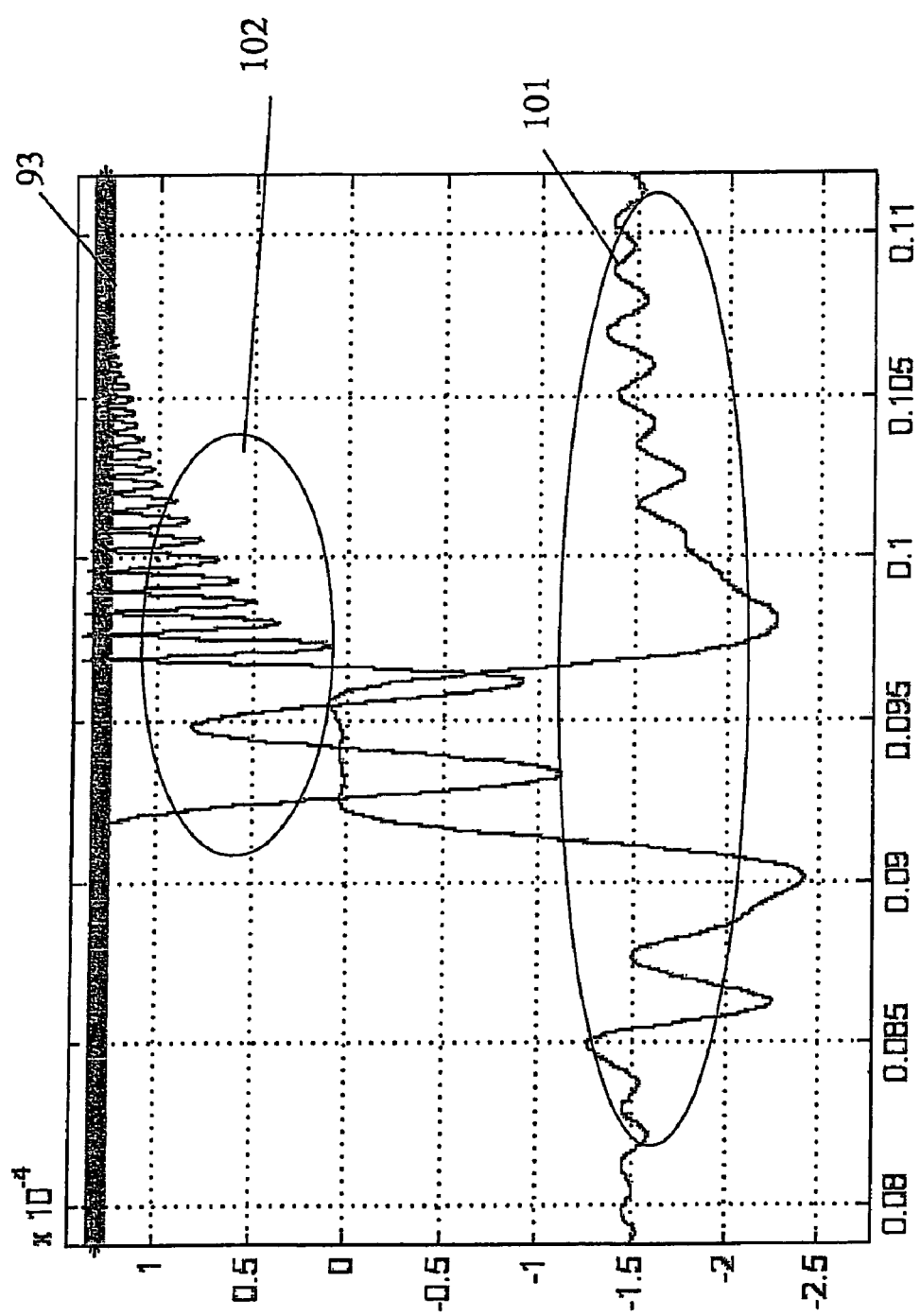
FIG. 19 is an enlarged view of a portion of FIG. 18.

A similar result is shown by FIGS. 17, 18 and 19, that show the result of a simulation performed by the Applicant with a conventional simulation tool. In the simulation, a model representing the cantilever-fashion piezoelectric power supplier unit described above with reference to FIGS. 15 and 16, disposed on the inner surface of a tyre, was considered. Acceleration profiles corresponding to actual radial acceleration signals taken from measurement performed at different rotation speeds with an accelerometer located on the inner surface of a tyre, was considered as the acceleration exciting the power supplier unit.

With reference to FIG. 17, curve 91 represents a portion of the acceleration profile versus time used for the simulation, taken at a speed of 40 km/h. Curve 92 represents the calculated displacement versus time experienced by the centre of mass of the piezoelectric element+loading mass structure. Straight line 93 represents the maximum allowed displacement in one direction, i.e. a half of the gap. The values reported in the y-axis of FIG. 17 refer to displacement values, and are to be considered as arbitrary units for the acceleration curve 91. As it can be seen by curve 92, continued oscillations are performed by the piezoelectric plate associated to the loading mass, around a second equilibrium position displaced from the first equilibrium position represented by the ordinate value "0", i.e. the equilibrium position taken by the piezoelectric plate when the tyre is stationary. The second equilibrium position is reached by the centre of mass of the loading mass being subject to the centrifugal acceleration developed during rotation. FIG. 17 shows both oscillations of smaller entity and oscillations of higher entity. The oscillations of higher entity correspond to the passage of the tyre portion associated to the power supplier unit under the contact patch, i.e. where the curve 91 reaches a substantially zero value. The oscillations of smaller entity are practically present and superimposed all over curve 92. It has also to be noticed that during the higher entity oscillations the centre of mass "hits" the straight line 93, corresponding to actual hitting of the loading mass against the inner walls of the power supplier unit housing.

With reference to FIG. 18, curve 101 represents a portion of the acceleration profile versus time used for the simulation, taken at a speed of 80 km/h. Curve 102 represents the calculated displacement versus time experienced by the centre of mass of the piezoelectric element+loading mass structure. Straight line 93 still represents the maximum allowed displacement in one direction, i.e. a half of the gap. The values reported in the y-axis of FIG. 18 refer to displacement values, and are to be considered as arbitrary units for the acceleration curve 101. As it can be seen by curve 102, pulsed oscillations are performed by the piezoelectric plate associated to the loading mass, starting from the maximum allowed displacement, at the passage of the tyre portion associated to the power supplier unit under the contact patch, i.e. where the curve 101 reaches a substantially zero value. FIG. 19 shows an enlarged portion of FIG. 10. As it can be seen in FIG. 19, curve 102 is initially superimposed to line 93, corresponding to a positioning of the loading mass against the inner walls of the housing. When the radial acceleration (curve 101) decreases, the loading mass begins free oscillation around the first equilibrium position (zero ordinate value in FIG. 19), as represented by the strong oscillation of curve 102 in the central portion of FIG. 19. When the radial acceleration increases, the loading is urged against the inner walls of the housing, that completes after a series of hits against the inner walls of the housing, as represented by the damped oscillations of curve 102 in the right portion of FIG. 19.

The Applicant has verified that a power supplier unit prepared as shown in FIG. 11a, 11b, associated to a tyre portion in correspondence of a tread area of a tyre as explained above, with the different components (piezoelectric element material, dimensions, number of piezoelectric layers, loading mass value, gap) sized so as to obtain a substantially continuous generation of electric charge when the tyre rotates at low speed and a substantially pulsed generation of electric charge when the tyre rotates at high speed, allows to obtain a sufficient electrical power for supplying common sensor devices to be included within a tyre for a monitoring of its functional parameters. In particular, a significant quantity of electrical charge can be generated at low speed, due to substantially continuous oscillation of the piezoelectric element.

As above explained, the features of the piezoelectric element 313 and loading mass 312, may be suitably chosen such that the amount of electric energy produced per tyre turn is substantially constant, irrespective of the tyre revolution speed. Thus, the distance covered by the tyre in use, may be easily calculated by the micro-controller 33, or by a remote unit connected to the external receiver, as a function of the parameter stored in the memory of the micro-controller itself, representative of the power pulses supplied to the sensor unit 11.

The distance covered by the tyre and/or any other functional parameter stored by the micro-controller 33 may be advantageously detected also when the vehicle is stopped, for example by a remote hand-held electronic unit (not shown) using a 125 KHz induction. Indeed, the antenna 12 lends itself to be coupled with an electromagnetic radiation field generated by such a remote hand-held electronic unit and draw the necessary energy for enabling the sensor unit 11 to send data relative to one or more functional parameters stored by the memory of the micro-controller 33.

Data exchange between sensor unit 11 and said remote hand-held electronic unit takes place through radio-frequency signal transmission and reception (RF signals), the frequency of which can be included between about 100 kHz and about 500 MHz, and preferably can correspond to about 125 kHz, or to about 13.5 MHz. Therefore co-operation between the remote hand-held electronic unit the antenna 12 and detecting unit 9 constitutes a detecting system enabling the detecting unit 9 also to operate when the tyre does not rotate, i.e. when the power supplier unit 31 is not working.

The detecting unit 9 may be conveniently provided with at least a weakened portion (not shown) suitable to broken when an attempt is made to disengage the detecting unit itself from the anchoring body 10. This ensures that the functional parameters stored in the detecting unit 9 actually belong to the tyre on which the detecting unit itself is mounted.

A great reliability of the power supplier unit has been also verified by the Applicant. The Applicant believes that this depends on the fact that at low speed the piezoelectric element is excited to oscillate to a small extent for the majority of time, whereas large oscillations occurring when the tyre portion associated to the power supplier unit passes under the contact patch may be limited with a suitable dimensioning of the gap between the inner walls of the housing and the outer surface of the loading mass. Thus, a strong reduction of the occurrence of cracks and breakings within the piezoelectric material may be obtained. The precise speed value at which the behaviour of the power supplier unit passes from "continuous generation of electric charge" to "pulsed generation of electric charge" depends on the precise dimensioning of the components forming the power supplier unit and also by the tyre size and characteristics. Advantageously, the dimensioning of the various components may be performed to obtain a behaviour change of the power supplier unit between intermediate speeds, preferably comprised between 30 km/h and 70 km/h, more preferably between 40 km/h and 60 km/h. Advantageously, in order to reduce the occurrence of resonant modes of the power supplier unit, the various components of the power supplier unit may be dimensioned so as to obtain a resonance frequency of the piezoelectric element+loading mass structure higher than 150 Hz, preferably higher than 200 Hz, more preferably higher than 300 Hz. The Applicant believes that such choice allows to further increase the reliability of the power supplier unit, since large resonant oscillations of the piezoelectric element are substantially avoided during tyre rotation, in any practical speed condition.

Exemplary preferred ranges for a power supplier unit using a bimorph PZT piezoelectric plate for obtaining the above explained performance may be the following:
  length of the PZT plate: from 8 to 18 mm;
  width of the PZT plate: from 3 to 18 mm;
  overall thickness of the bimorph plate: from 0.30 to 1.20 mm;
  loading mass: from 0.05 g to 3 g
  gap: from 50 to 400 μm.

With particular reference to the loading mass size, it has to be noticed that a low size of the loading mass allows to increase the resonance frequency of the piezoelectric element+loading mass structure. Furthermore, a low size of the loading mass allows to reduce unbalancing caused to the tyre rotation due to the presence of the power supplier unit. Moreover, a low size of the loading mass allows to reduce the occurrence of cracks and breakings in the power supplier unit housings caused by the hits against the inner walls during oscillation. However, a too low size of the loading mass does not allow sufficient bending of the piezoelectric element, with consequent insufficient generation of electrical charge. A guideline for the dimensioning of the power supplier unit could be to choose a loading mass size m sufficient to substantially avoid unbalancing of the tyre during rotation (e.g. a mass lower than 3 gr.), to choose a resonance frequency $f_r$ for the piezoelectric element+loading mass structure (e.g. higher than 150 Hz) and then derive the dimensions of the piezoelectric element from its stiffness k, calculated by inverting the following well known relationship:

$$f_r = \frac{1}{2\pi}\sqrt{\frac{k}{m}}$$

Assembling of the detecting device 8 to the tyre can be carried out through fastening by adhesion of the fastening surface 14 to the radially internal surface 1a of the tyre, after said tyre has been made through the usual manufacturing and moulding-vulcanisation steps provided in the production cycle. Fastening can be obtained through gluing or vulcanisation, for instance through vulcanisation in situ of a skim coat of elastomeric material placed between the fastening surface 14 and the radially internal surface 1a of the tyre, preferably in such a manner that the fastening surface 14 is in a symmetrically centred position relative to the equatorial plane of the tyre and the auxiliary groove 20 preferably extends transversely of the circumferential extension of tyre 1.

Due to the particular shape of the anchoring body 10 and to the fact that the detecting unit 9 can be assembled to said anchoring body 10 subsequently, for carrying out said vulcanisation use of simple presses can provided that, through pressure generation, will press the anchoring body 10 against the radially internal surface 1a, while at the same time supplying the necessary heat. Subsequently, when vulcanisation has been completed, the detecting unit 9 is inserted.

In an alternative embodiment a polymer-based solution/rubber cement is provided that is laid/spread on the radially internal surface 1a of tyre 1 and the fastening surface 14 of the anchoring body 10 and subsequently cured through pressure and temperature application.

The above described processes are also advantageously adapted for application of the detecting device 8 to already produced tyres and possibly even to tyres already in use on motor vehicles.

Figure 20:
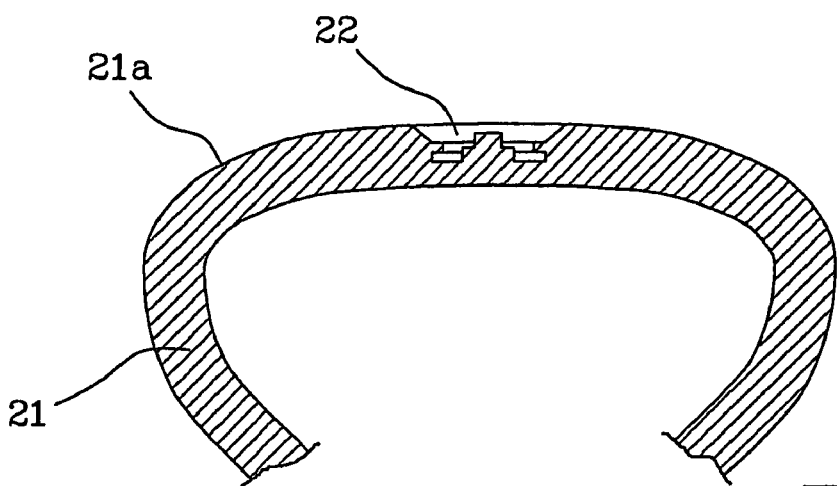
FIG. 20 is a diagrammatic section view of a toroidal support provided, on an outer surface thereof, with a forming cavity the shape of which matches that of the anchoring body of the detecting device.
Figure 21:
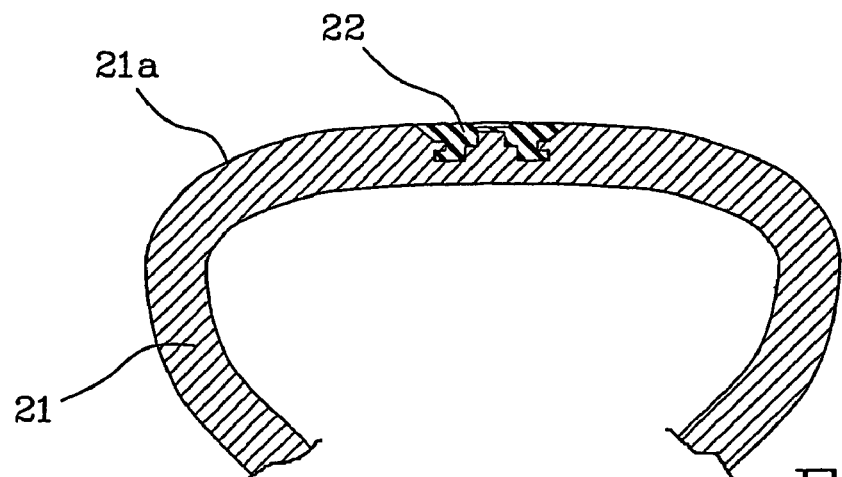
FIG. 21 shows the forming cavity in FIG. 10 filled with elastomeric material.
Figure 22:
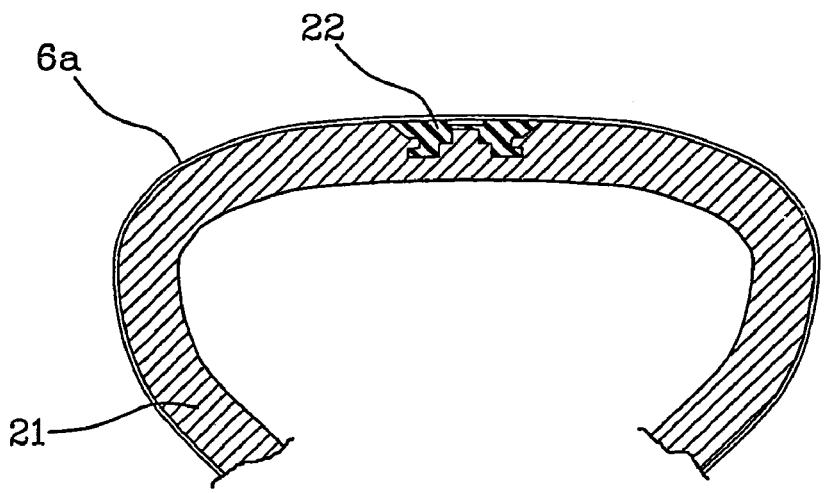
FIG. 22 shows a starting step of the forming operation of the carcass structure on the outer surface of the toroidal support.

Alternatively, the anchoring body 10 can be directly formed during the tyre manufacturing process, when this process involves formation of the constituent components directly on a toroidal support 21 conforming in shape to the inner surface 1a of the tyre. In more detail, to this aim provision is made for at least one forming cavity 22 (FIG. 20) matching the shape of the anchoring body 10 of the detecting device 8 to be set on the outer surface of said toroidal support 21. Introduced into said forming cavity 22 is a predetermined amount of raw elastomeric material (FIG. 21) sufficient to fill the cavity itself so that said cavity is flush with the outer surface 21a of the toroidal support 21. Then formation of the carcass structure 2 of tyre 1 against the outer surface 21a of the toroidal support is started. In more detail, manufacture of the carcass structure 2 can start with formation of liner 6a obtained through winding of a continuous elongated element of raw elastomeric material into coils suitably distributed to cover the outer surface of the toroidal support 21 itself, as shown in FIG. 22. The subsequent steps of forming the carcass structure 2 and assembling the other constituent components of tyre 1 are not herein described as they can be carried out in a manner known by itself, as described for example in document EP-976535 in the name of the same Applicant.

When assembling has been completed, tyre 1 is introduced into a mould to be submitted to a vulcanisation step, following which the elastomeric material introduced into the forming cavity 22 will form the anchoring body 10, steadily joined to liner 6a defining the radially internal surface 1a of the tyre itself. When vulcanisation is over, the toroidal support 21 is removed from tyre 1 and manufacture of the detecting device 8 can be completed with engagement of the detecting unit 9 on the anchoring body 10.

The invention claimed is:

1. A tyre provided with a device for detecting at least one functional parameter in the tyre, comprising:
   a substantially toroidal carcass structure defining a radially internal surface of the tyre;
   an anchoring body secured to the radially internal surface of the tyre; and
   a detecting unit comprising an antenna, a sensor unit operatively connected to said antenna, and a power supplier unit comprising a housing and a piezoelectric element, said power supplier unit being electrically connected with said sensor unit, wherein:
   the detecting unit and the anchoring body fit together by at least a rim portion engaging in a respective locking slot;
   said piezoelectric element is disposed within said housing so as to have a first end substantially fixed to said housing and a second end associated with a loading mass, a gap being formed between at least one inner wall of said housing and an outer surface of said loading mass; and
   said piezoelectric element is positioned substantially along a plane orthogonal to a radial direction of said tyre.

2. The tyre according to claim 1, wherein said piezoelectric element, said loading mass and said gap are sized so as to obtain:
   a) during rotation of the tyre on a rolling surface at a first rotation speed lower than a given speed, an oscillation within said gap of said loading mass associated with said piezoelectric element;
   b) during rotation of the tyre on said rolling surface at a second rotation speed higher than said given speed, a contact of said loading mass with said inner wall of said housing during a first fraction of a complete tyre revolution, during said first fraction said tread area corresponding to said tyre portion being not in contact with said rolling surface, and an oscillation within said gap of said loading mass associated with said piezoelectric element during a second fraction of a complete tyre revolution, during said second fraction said tread area corresponding to said type portion being in contact with the rolling surface.

3. The tyre according to claim 1, wherein the piezoelectric element has a longer side disposed substantially according to an axial direction of the tyre.

4. The tyre according to claim 1, wherein said given speed is 30 km/h to 70 km/h.

5. The tyre according to claim 1, wherein a resonance frequency of said piezoelectric element associated with said loading mass within said housing is higher than 150 Hz.

6. The tyre according to claim 1, wherein said loading mass is lower than 3 gr.

7. The tyre according to claim 1, wherein said loading mass is U-shaped.

8. The tyre according to claim 1, wherein said gap has a maximum extent of 400 μm.

9. The tyre according to claim 1, wherein said piezoelectric element is a bimorph element.

10. The tyre according to claim 1, wherein said piezoelectric element is a planar element.

11. The tyre according to claim 1, wherein a material of said piezoelectric element is lead zirconate titanate.

12. The tyre according to claim 1, wherein said power supplier unit is electrically connected with said sensor unit through a voltage preparation circuit, said voltage preparation circuit being provided with at least a capacitor.

13. The tyre according to claim 1, wherein said sensor unit comprises a micro-controller provided with a memory.

14. The tyre according to claim 1, wherein said rim portion belongs to said detecting unit and said locking slot belongs to said anchoring body.

15. The tyre according to claim 1, wherein the anchoring body is provided with a fastening surface secured to said radially internal surface of the tyre, said locking slot comprising a perimetral groove spaced-apart from the fastening surface.

16. The tyre according to claim 15, wherein said rim portion comprises an inner perimetral edge provided by the antenna, so that the detecting unit is inserted within the anchoring body through said inner perimetral edge fitted in said perimetral groove following elastic deformation of at least a portion of the anchoring body.

17. The tyre according to claim 16, wherein the anchoring body comprises:
   a base portion carrying said fastening surface; and
   a retaining portion associated with the base portion and having a top surface facing away from the fastening surface,
   said perimetral groove being formed between the base portion and retaining portion.

18. The tyre according to claim 17, wherein the anchoring body has an overall height measured between the fastening surface of the base portion and the top surface of the retaining portion of about 0.2 to about 1.5 times a maximum distance measured between two mutually spaced apart points along said inner perimetral edge.

19. The tyre according to claim 17, wherein the anchoring body has a central cavity extending from the top surface toward the fastening surface.

20. The tyre as claimed in claim 19, wherein the central cavity has an axial extension at least equal to the axial size of the retaining portion added to the axial size of the perimetral groove.

21. The tyre according to claim 17, wherein the base portion has a height extension of 40% to 50% of the overall height of the anchoring body.

22. The tyre according to claim 17, wherein the retaining portion has a height of 90% to 110% of the width of the perimetral groove.

23. The tyre according to claim 17, wherein the retaining portion has an outer diameter larger than the inner diameter of the antenna.

24. The tyre according to claim 17, wherein the maximum diameter measured on the fastening surface of the base portion is 110% to 120% of the outer diameter of said antenna.

25. The tyre according to claim 17, wherein the base portion has a conformation tapering toward the perimetral groove.

26. The tyre according to claim 17, wherein the base portion has a perimetral surface tapering toward the perimetral groove by an angle of 15° to 45° relative to a plane containing the perimetral groove.

27. The tyre according to claim 17, wherein the ratio of the overall height of the anchoring body to the maximum diameter of the base portion at the fastening surface is about 0.2 to about 0.3.

28. The tyre according to claim 17, wherein the fastening surface of the base portion extends along a curvilinear surface extension.

29. The tyre according to claim 17, wherein the base portion has an auxiliary groove formed in the fastening surface.

30. The tyre as claimed in claim 29, wherein the auxiliary groove extends in a direction lying in a plane containing a housing recess.

31. The tyre as claimed in claim 30, wherein the auxiliary groove extends transversely of the circumferential extension of the tyre.

32. The tyre according to claim 1, wherein the anchoring body is integral with the carcass structure of said tyre.

33. A tyre according to claim 1, wherein the anchoring body and the antenna of the detecting unit have a circular conformation.

34. The tyre according to claim 1, comprising at least one recess for the sensor unit and the power supplier unit in the anchoring body.

35. The tyre according to claim 1, wherein the locking slot extends according to a profile geometrically mating in shape the conformation of the rim portion.

36. The tyre according to claim 1 wherein said housing extends diametrically with respect to said antenna.

37. The tyre as claimed in claim 1, wherein both the sensor unit and power supplier unit are provided within the housing.

38. The tyre is claimed in claim 1, wherein the housing exhibits opposite ends joined to the antenna at diametrically opposite positions.

39. The tyre according to claim 1, wherein said detecting unit further comprises a radio transmitter operatively connected to said sensor unit and said antenna for transmitting data representative of at least one functional parameter of the tyre to an external receiver.

40. The tyre according to claim 1, wherein the anchoring body is made of an elastomeric material having a hardness of about 35° to about 60° Shore A.

41. The tyre according to claim 1, wherein the detecting unit comprises at least a weakened portion capable of being broken when the detecting unit is disengaged from the anchoring body.

42. A device for detecting at least one functional parameter in a tyre, comprising:
  an anchoring body securable to a radially internal surface of a tyre; and
  a detecting unit comprising an antenna, a sensor unit operatively connected to said antenna, and a power supplier unit comprising a housing and a piezoelectric element, said power supplier unit being electrically connected to said sensor unit, wherein:
  the detecting unit and the anchoring body fit together by at least a rim portion engaging in a respective locking slot;
  said piezoelectric element is disposed within said housing so as to have a first end substantially fixed to said housing and a second end associated with a loading mass, a gap being formed between at least one inner wall of said housing and an outer surface of said loading mass; and
  said piezoelectric element is positioned substantially along a plan orthogonal to a radial direction of said tyre.

43. The device according to claim 42, wherein said power supplier unit is electrically connected to said sensor unit through a voltage preparation circuit, said voltage preparation circuit being provided with at least a capacitor.

44. The device according to claim 42, wherein said sensor unit comprises a micro-controller provided with a memory.

45. The device according to claim 42, wherein said detecting unit comprises said rim portion; and said anchoring body comprises said locking slot.

46. The device according to claim 42, wherein the anchoring body is provided with a fastening surface secured to said radially internal surface of the tyre and a perimetral groove spaced-apart from the fastening surface.

47. The device according to claim 46, wherein said rim portion comprises an inner perimetral edge provided by the antenna, so that the detecting unit is inserted within the anchoring body through said inner perimetral edge fitted in said perimetral groove following elastic deformation of at least a portion of the anchoring body.

48. The device according to claim 46, wherein the anchoring body comprises:
  a base portion carrying said fastening surface; and
  a retaining portion associated with the base portion and having a top surface facing away from the fastening surface,
  said perimetral groove being formed between the base portion and retaining portion.

49. The device according to claim 48, wherein the anchoring body has a central cavity extending from the top surface toward the fastening surface.

50. The device according to claim 48, wherein the base portion has a conformation tapering toward the perimetral groove.

51. The device according to claim 48, wherein the fastening surface of the base portion extends along a curvilinear surface extension.

52. The device according to claim 48, wherein the base portion has an auxiliary groove formed in the fastening surface.

53. The device according to claim 52, wherein the auxiliary groove extends in a direction lying in a plane containing a housing recess.

54. The device according to claim 42, wherein said detecting unit further comprises a radio transmitter operatively connected to said sensor unit and said antenna for transmitting data representative of at least one functional parameter of the tyre to an external receiver.

55. The device according to claim 42, wherein the anchoring body and the antenna of the detecting unit have a circular conformation.

56. The device according to claim 42, comprising at least one recess for the sensor unit and the power supplier unit in the anchoring body.

57. The device according to claim 42, wherein the locking slot extends according to a profile geometrically mating in shape the conformation of the rim portion.

58. The device according to claim 42, wherein said housing extends diametrically with respect to said antenna.

59. The device according to claim 42, wherein both the sensor unit and power supplier unit are provided within the housing.

60. The device according to claim 42, wherein the housing exhibits opposite ends joined to the antenna at diametrically opposite positions.

61. The device according to claim 42, wherein the detecting unit comprises at least a weakened portion capable of being broken when the detecting unit is disengaged from the anchoring body.

62. The device according to claim 42, wherein said piezoelectric element, said loading mass and said gap are sized so as to obtain:
   a) during rotation of the tyre on a rolling surface at a first rotation speed lower than a given speed, an oscillation within said gap of said loading mass associated with said piezoelectric element; and
   b) during rotation of the tyre on said rolling surface at a second rotation speed higher than said given speed, a contact of said loading mass with said inner wall of said housing during a first fraction of a complete tyre revolution, during said first fraction said tread area corresponding to said tyre portion being not in contact with said rolling surface, and an oscillation within said gap of said loading mass associated with said piezoelectric element during a second fraction of a complete tyre revolution, during said second fraction said tread area corresponding to said tyre portion being in contact with the rolling surface.

63. A system for monitoring at least one functional parameter in a tyre comprising:
   a device according to claim 42; and
   an external receiver suitable for being mounted on a vehicle for receiving data transmitted through the antenna.

64. A method for detecting at least one functional parameter in a tyre, comprising:
   providing an anchoring body secured to a radially internal surface of a tyre;
   providing a detecting unit comprising an antenna, a sensor unit operatively connected to said antenna, and a power supplier unit comprising a housing and a piezoelectric element, said power supplier unit being electrically connected with said sensor unit, wherein said piezoelectric element is disposed within said housing so as to have a first end substantially fixed to said housing and a second end associated with a loading mass, a cap being formed between at least one inner wall of said housing and an outer surface of said loading mass;
   fitting the detecting unit with the anchoring body by engaging at least a rim portion in a respective locking slot, whereby said piezoelectric element is positioned substantially along a plane orthogonal to a radial direction of said tyre following the engaging step;
   rotating said tyre on a rolling surface so as to cause deformations of said piezoelectric element during said tyre rotation;
   collecting electrical energy generated from said deformations of said piezoelectric element;
   powering the sensor unit by the collected electrical energy; and
   detecting said at least one functional parameter by said sensor unit.

65. The method according to claim 64, wherein the sensor unit comprises a memory, and further comprising the step of storing in said memory, data representative of at least a functional parameter of the tyre.

66. The method according to claim 65, further comprising the steps of:
   stopping rotation of the tyre;
   power supplying the detecting unit by exposing said antenna to electromagnetic radiation; and
   enabling the detecting unit for transmitting stored data representative of said at least one functional parameter of the tyre.

67. The method according to claim 64, comprising powering of the sensor unit by providing the sensor unit with a power pulse every time the collected amount of electrical energy reaches a predetermined threshold value.

68. The method according to claim 67, further comprising the steps of:
   counting the power pulses provided to the sensor unit; and
   storing a functional parameter representative of the counted power pulses.

69. The method according to claim 68, further comprising the step of calculating the distance covered by the tyre in use, as a function of the amount of the counted power pulses.

70. The method according to claim 64, wherein rotation of the tyre comprises the steps of:
   rotating said tyre on said rolling surface at a first rotation speed lower than a given speed, so as to cause said loading mass to oscillate within said gap, thereby leading to a first deformation of said piezoelectric element during said tyre rotation; and
   rotating said tyre on said rolling surface at a second rotation speed higher than said given speed, so as to cause said loading mass to contact said inner wall during a first fraction of a complete tyre revolution, during said first fraction said tread area corresponding to said tyre portion being not in contact with the rolling surface, and to cause said loading mass to oscillate within said gap during a second fraction of a complete tyre revolution, during said second fraction said tread area corresponding to said tyre portion being in contact with the rolling surface, thereby leading to a second deformation of said piezoelectric element during said tyre rotation.

71. The method according to claim 70, wherein said given speed is 30 km/h to 70 km/h.

72. The method according to claim 64, wherein the piezoelectric element has a longer side disposed substantially according to an axial direction of the tyre.

73. The method according to claim 64, wherein during said rotation at said second rotation speed, said loading mass oscillates around a first equilibrium position, substantially disposed along said plane orthogonal to said radial direction of the tyre.

74. The method according to claim 73, wherein during said rotation at said first rotation speed, said loading mass oscillates around a second equilibrium position with said gap, different from said first equilibrium position.

75. The method according to claim 64, further comprising the step of providing said detecting unit with at least a weakened portion capable of being broken when the detecting unit is disengaged from the anchoring body.

* * * * *

UNITED STATES PATENT AND TRADEMARK OFFICE
CERTIFICATE OF CORRECTION

PATENT NO. : 7,999,663 B2
APPLICATION NO. : 11/920150
DATED : August 16, 2011
INVENTOR(S) : Federico Mancosu et al.

It is certified that error appears in the above-identified patent and that said Letters Patent is hereby corrected as shown below:

In claim 38, column 23, line 57, "is claimed" should read --as claimed--.

Signed and Sealed this
Fifteenth Day of January, 2013

David J. Kappos
*Director of the United States Patent and Trademark Office*